US010332316B2

(12) United States Patent
Saito

(10) Patent No.: US 10,332,316 B2
(45) Date of Patent: Jun. 25, 2019

(54) METHOD FOR PRESENTING CONTENTS IN VIRTUAL SPACE, SYSTEM FOR EXECUTING THE METHOD, AND CONTENTS PRESENTING APPARATUS

(71) Applicant: COLOPL, Inc., Tokyo (JP)

(72) Inventor: Kana Saito, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/854,606

(22) Filed: Dec. 26, 2017

(65) Prior Publication Data

US 2018/0253903 A1 Sep. 6, 2018

(30) Foreign Application Priority Data

Dec. 27, 2016 (JP) .................................. 2016-253616

(51) Int. Cl.
*G06T 15/00* (2011.01)
*G06T 19/00* (2011.01)
(Continued)

(52) U.S. Cl.
CPC ............ *G06T 19/006* (2013.01); *A63F 13/30* (2014.09); *G02B 27/017* (2013.01); *G06F 3/011* (2013.01);
(Continued)

(58) Field of Classification Search
CPC ......... G06T 19/006; G06T 7/70; G06F 3/013; G06F 3/014; H04N 13/383; H04N 13/344; H04L 67/38
(Continued)

(56) References Cited

U.S. PATENT DOCUMENTS 5,900,849 A * 5/1999 Gallery .................. G06F 3/011
273/148 B
6,077,085 A * 6/2000 Parry ..................... G09B 5/065
434/118
(Continued)

FOREIGN PATENT DOCUMENTS

JP 2003-228279 A 8/2003
JP 2012-98410 A 5/2012
(Continued)

OTHER PUBLICATIONS

English Translation of JP Patent application No. 2016-24282, Feb. 2016, pp. 1-27.*
(Continued)

*Primary Examiner* — Phu K Nguyen
(74) *Attorney, Agent, or Firm* — Hauptman Ham, LLP

(57) ABSTRACT

A method includes defining a virtual space. The virtual space includes a plurality of first objects and a second object. The method further includes associating each situation of a plurality of situations with a corresponding first object. The method further includes moving the second object in accordance with a detected motion of a head-mounted display. The method further includes updating the virtual space to a virtual space corresponding to a situation of the plurality of situations corresponding to a selected first object. The method further includes displaying in the virtual space a plurality of words associated with the corresponding situation. The method further includes associating a selected at least one word with the selected situation and registering the associated at least one word in a word list.

20 Claims, 24 Drawing Sheets

(51) Int. Cl.
*G06F 3/01* (2006.01)
*H04N 13/383* (2018.01)
*H04L 29/06* (2006.01)
*G06T 7/70* (2017.01)
*A63F 13/30* (2014.01)
*G06F 3/023* (2006.01)
*G02B 27/01* (2006.01)
*G06F 3/0346* (2013.01)
*G09B 19/00* (2006.01)
*H04N 13/344* (2018.01)

(52) U.S. Cl.
CPC .............. *G06F 3/013* (2013.01); *G06F 3/014* (2013.01); *G06F 3/023* (2013.01); *G06F 3/0346* (2013.01); *G06T 7/70* (2017.01); *G09B 19/0038* (2013.01); *H04L 67/38* (2013.01); *H04N 13/383* (2018.05); *H04N 13/344* (2018.05)

(58) Field of Classification Search
USPC ........................................................ 345/419
See application file for complete search history.

(56) References Cited

U.S. PATENT DOCUMENTS

| | | | | |
|---|---|---|---|---|
| 7,430,317 B2* | 9/2008 | Gaida | ................... | G06F 17/211 |
| | | | | 382/162 |
| 9,884,248 B2* | 2/2018 | Koseki | ................ | A63F 13/212 |
| 9,897,805 B2* | 2/2018 | Stafford | ............. | G02B 27/0093 |
| 2010/0003658 A1* | 1/2010 | Fadel | ....................... | G09B 7/02 |
| | | | | 434/322 |
| 2014/0049558 A1* | 2/2014 | Krauss | ................... | G06F 3/011 |
| | | | | 345/633 |
| 2014/0127667 A1 | 5/2014 | Iannacone | | |
| 2015/0352437 A1 | 12/2015 | Koseki et al. | | |

FOREIGN PATENT DOCUMENTS

| | | |
|---|---|---|
| JP | 2014-145976 A | 8/2014 |
| JP | 2015-60074 A | 3/2015 |
| JP | 2015-194756 A | 11/2015 |
| JP | 2015-232783 A | 12/2015 |
| JP | 2016-24282 A | 2/2016 |
| JP | 2016-114673 A | 6/2016 |
| JP | 2016-122139 A | 7/2016 |

OTHER PUBLICATIONS

Office Action in JP Application No. 2016-253616, dated Aug. 29, 2017, 10pp.
Naoki Sekiguchi et al., "Word Learning System with Subject Images Using Head-mount Display", IEICE Technical Report ET2013-113, Mar. 1, 2014, vol. 113 No. 482, The Institute of Electronics, Information and Communication Engineers, pp. 125-130, Japan.

* cited by examiner

| SITUATION | EXAMPLE SENTENCE ID | EXAMPLE SENTENCE |
|---|---|---|
| AIRPORT | 001 | Do you know hot to get to the hotel? |
| AIRPORT | 002 | Excuse me, but where is a taxi stand? |
| ... | ... | ... |
| RESTAURANT | | |
| BANK | | |
| BOUTIQUE | | |
| HOSPITAL | | |
| TRAIN STATION | | |
| HOTEL | | |
| CITY HALL | | |
| POLICE STATION | | |
| ... | | |

1020

| USER NAME | USER ID | REGISTRATION DATE | FINAL LOGIN DATE AND TIME | STATUS |
|---|---|---|---|---|
| Taro | ABC | 20160905 | 20161013 | ONLINE |
| Jiro | DEF | 20161005 | 20161015 | OFFLINE |
| Hanako | GHI | 20161105 | 20161020 | ONLINE |
| ... | ... | ... | ... | ... |

1030

| USER ID | SITUATION | EXAMPLE SENTENCE ID | WORD | SELECTION MODE |
|---|---|---|---|---|
| ABC | AIRPORT | 001 | know | USER SELECTION |
| ABC | AIRPORT | 002 | stand | AUTOMATIC SELECTION |
| DEF | RESTAURANT | 002 | check | INSTRUCTOR SELECTION |
| GHI | HOTEL | 003 | wake-up call | AUTOMATIC SELECTION |
| ABC | HOSPITAL | 004 | stomachache | AUTOMATIC SELECTION |
| ... | ... | ... | ... | ... |

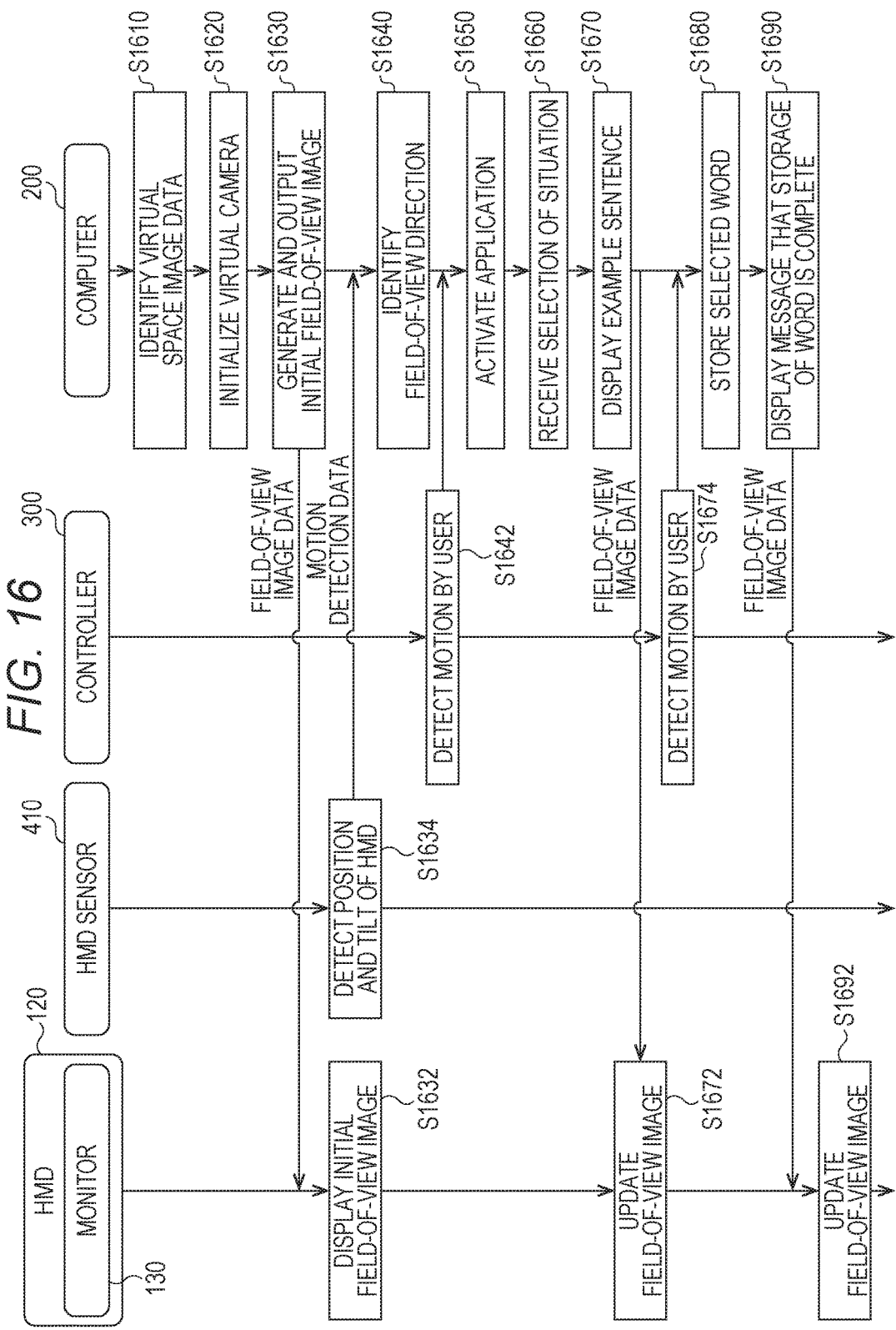

METHOD FOR PRESENTING CONTENTS IN VIRTUAL SPACE, SYSTEM FOR EXECUTING THE METHOD, AND CONTENTS PRESENTING APPARATUS

RELATED APPLICATIONS

The present application claims priority to Japanese Patent Application No. 2016-253616 filed Dec. 27, 2016, the disclosure of which is hereby incorporated by reference herein in its entirety.

TECHNICAL FIELD

This disclosure relates to presentation of content in a virtual space, and more particularly, to presentation of content for supporting learning by using a virtual space.

BACKGROUND

There is known a technology for supporting learning of a foreign language by using a computer or a robot. For example, in Japanese Patent Application Laid-open No. 2014-145976 (Patent Document 1), there is described a "foreign language conversation learning system in which a robot, which has a recognition function (hearing function and environment recognition function) and an expression function (vocalization function, motion function, and display function) and only hears and vocalizes a learning language, improves a foreign language ability of a student by using only the learning language" (refer to paragraph [0001]).

PATENT DOCUMENTS

[Patent Document 1] JP 2014-145976 A

SUMMARY

According to at least one embodiment of this disclosure, there is provided a method including defining a virtual space to be presented on a head-mounted device (HMD), the virtual space including a plurality of first objects and a second object. The method further includes defining a plurality of situations to be developed in the virtual space. The method further includes associating each of the plurality of situations with each of the plurality of first objects. The method further includes detecting motion by a user associated with the HMD; moving the second object in accordance with the motion. The method further includes selecting any one of the plurality of first objects in accordance with a positional relation between the second object and each of the plurality of first objects. The method further includes selecting from among the plurality of situations a situation that is associated with the selected one of the plurality of first objects. The method further includes updating the virtual space to a virtual space corresponding to the selected situation. The method further includes presenting in the updated virtual space a plurality of words associated with the situation. The method further includes selecting any one of the plurality of words based on the motion. The method further includes associating the selected one of the plurality of words with the selected situation and registering the associated one of the plurality of words in a word list.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 15 A schematic diagram of a mode of storing data in a memory of the server according to at least one embodiment of this disclosure.

FIG. 16 A flowchart of processing to be executed by the HMD set according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
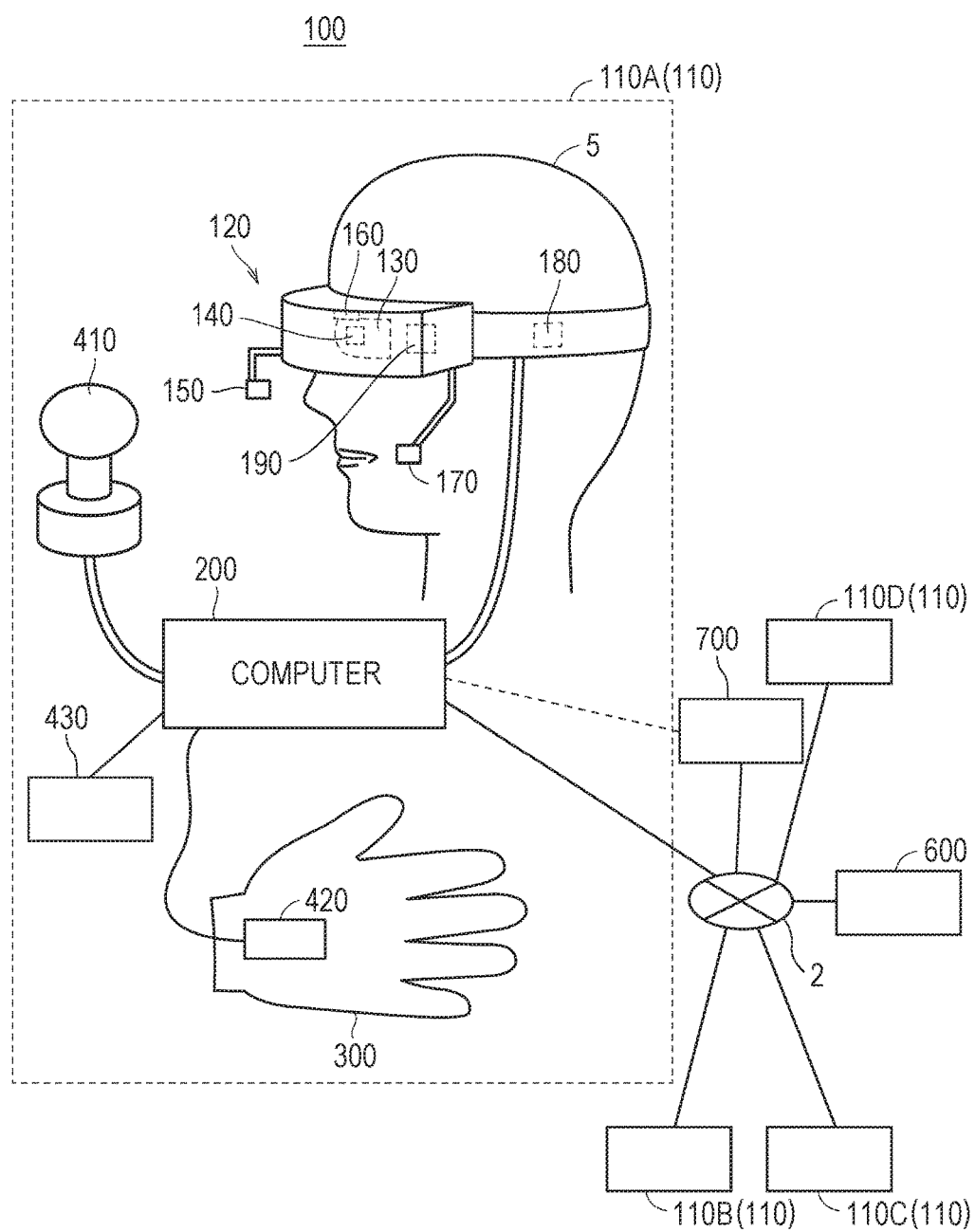
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least anyone of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
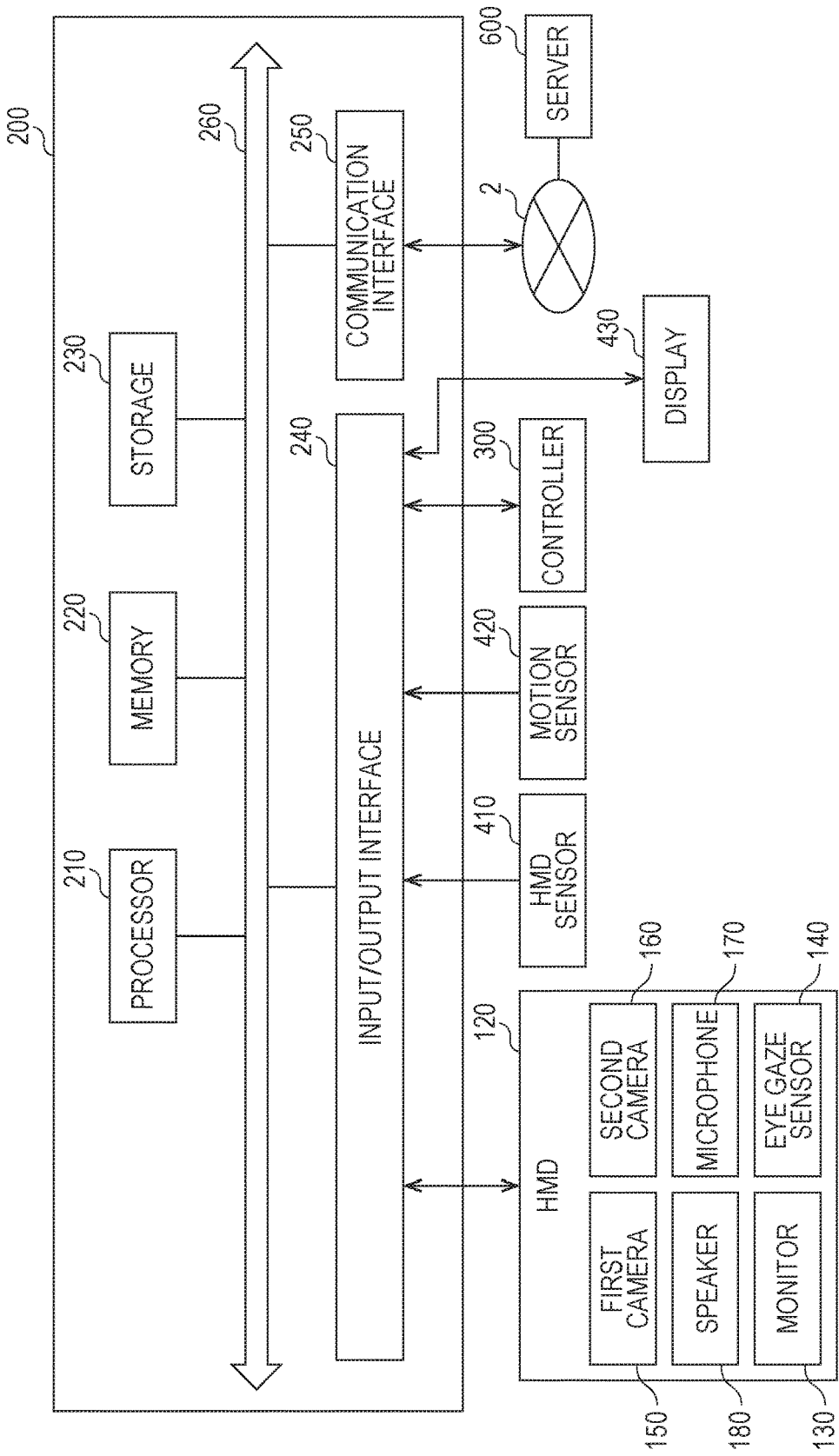
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth (R), near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
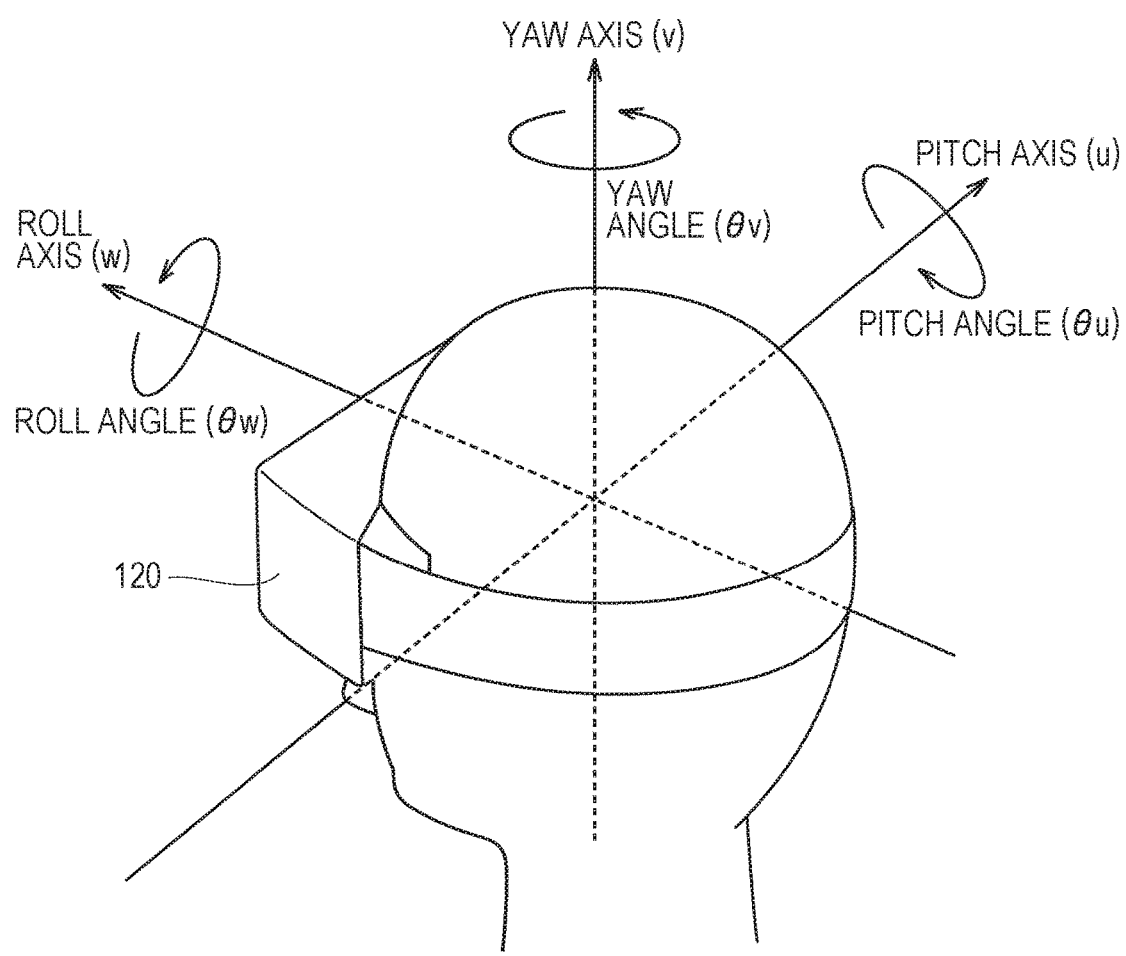
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
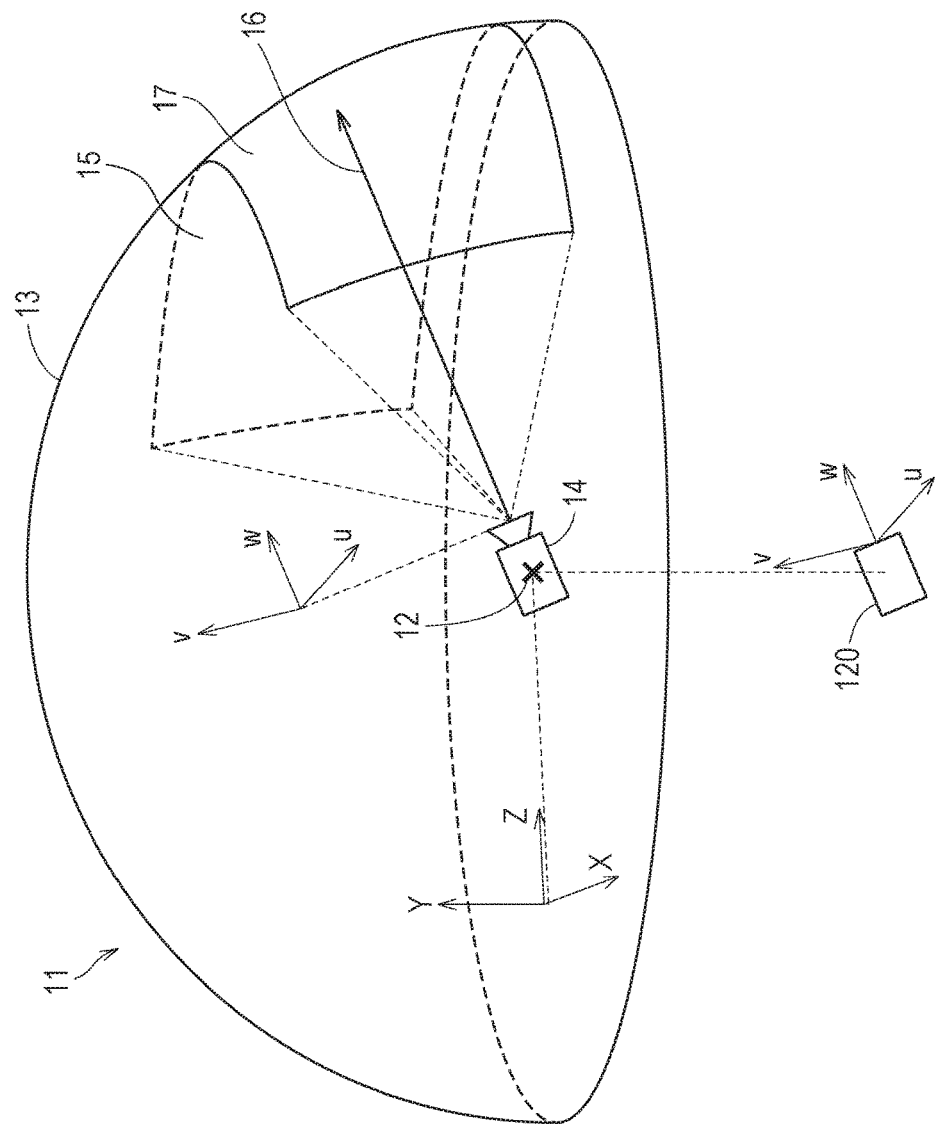
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
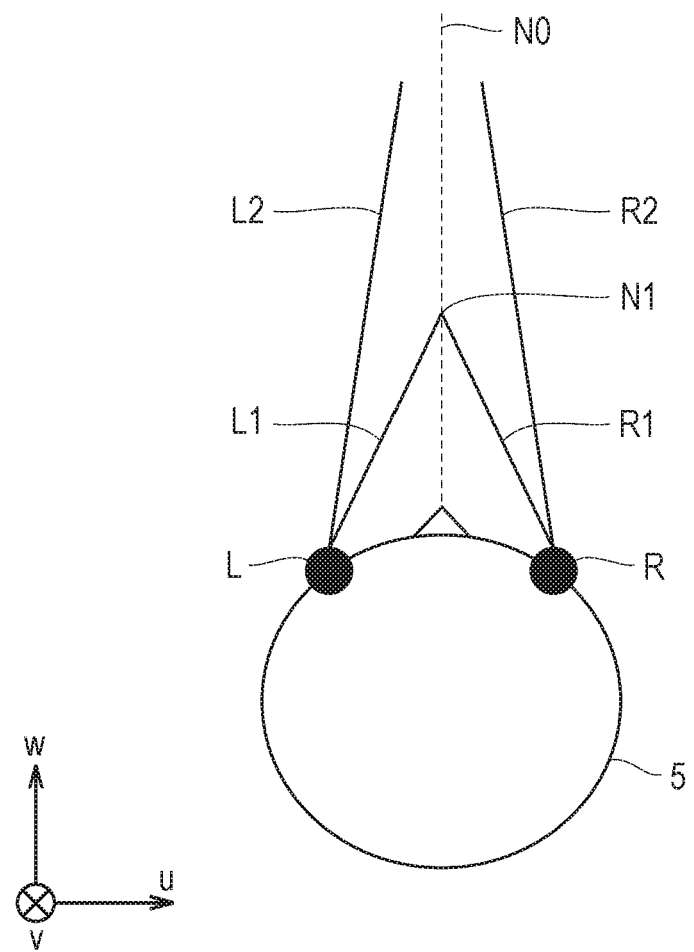
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
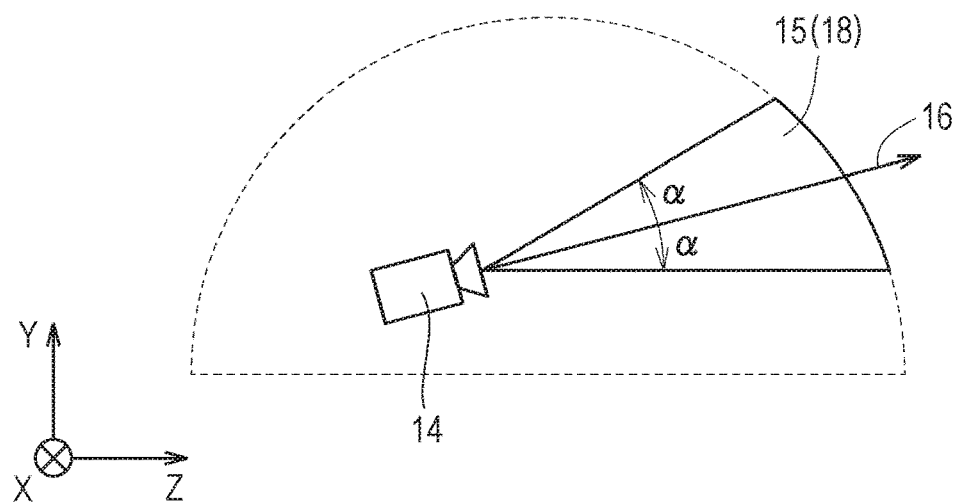
FIG. 6 A diagram of a YZ cross section obtained by viewing a field-of-view region from an X direction in the virtual space according to at least one embodiment of this disclosure.
Figure 7:
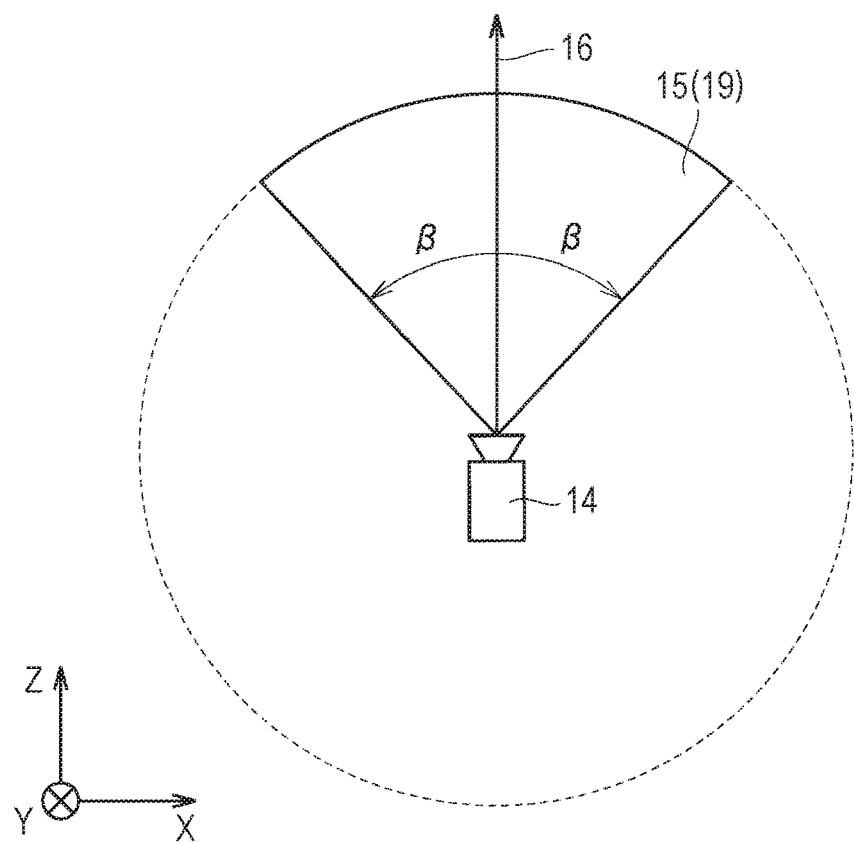
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
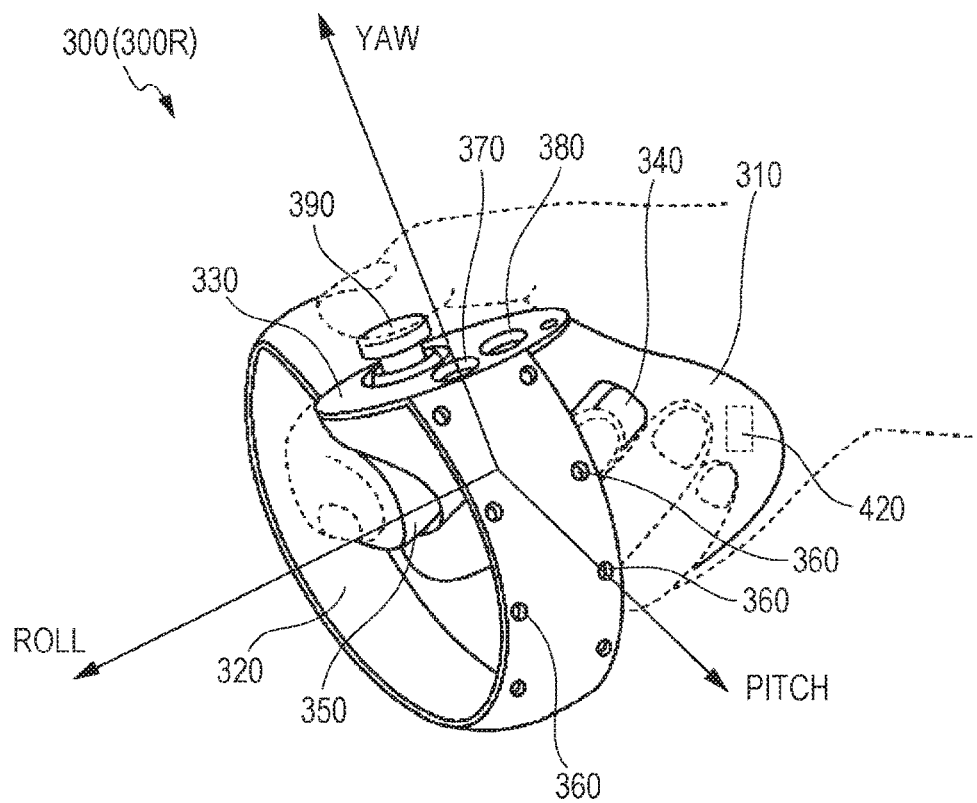
FIG. 8A A diagram of a schematic configuration of a controller according to at least one embodiment of this disclosure.
Figure 8B:
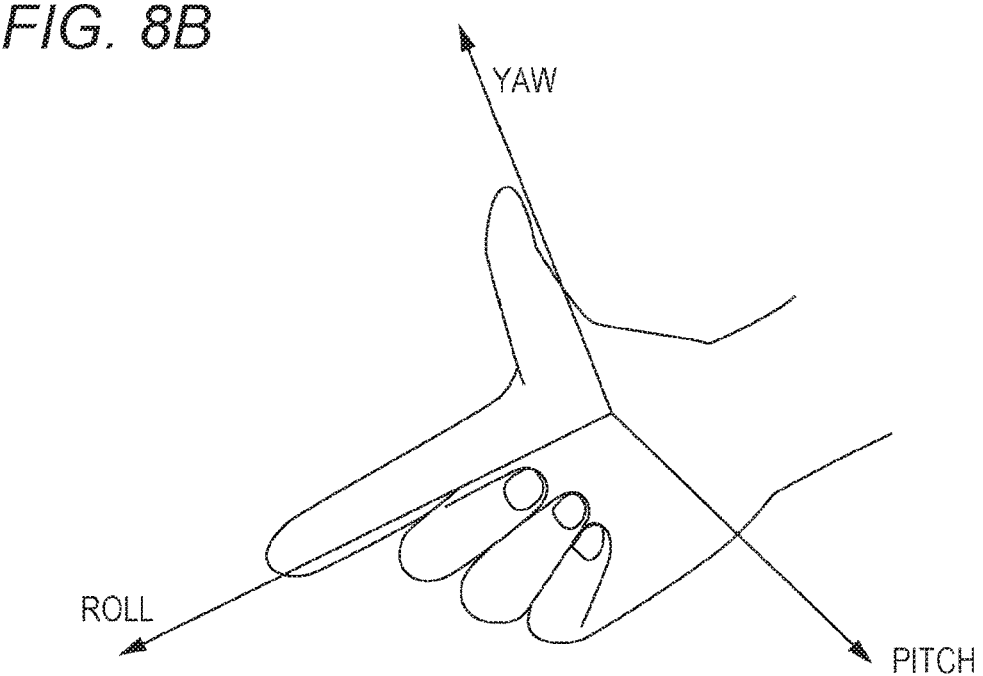
FIG. 8B A diagram of an example of a yaw direction, a roll direction, and a pitch direction that are defined with respect to a right hand of the user according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIGS. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane defined by the yaw-direction axis and the roll-direction axis when the user 5 extends his or her thumb and index finger is defined as the pitch direction.

[Hardware Configuration of Server]

Figure 9:
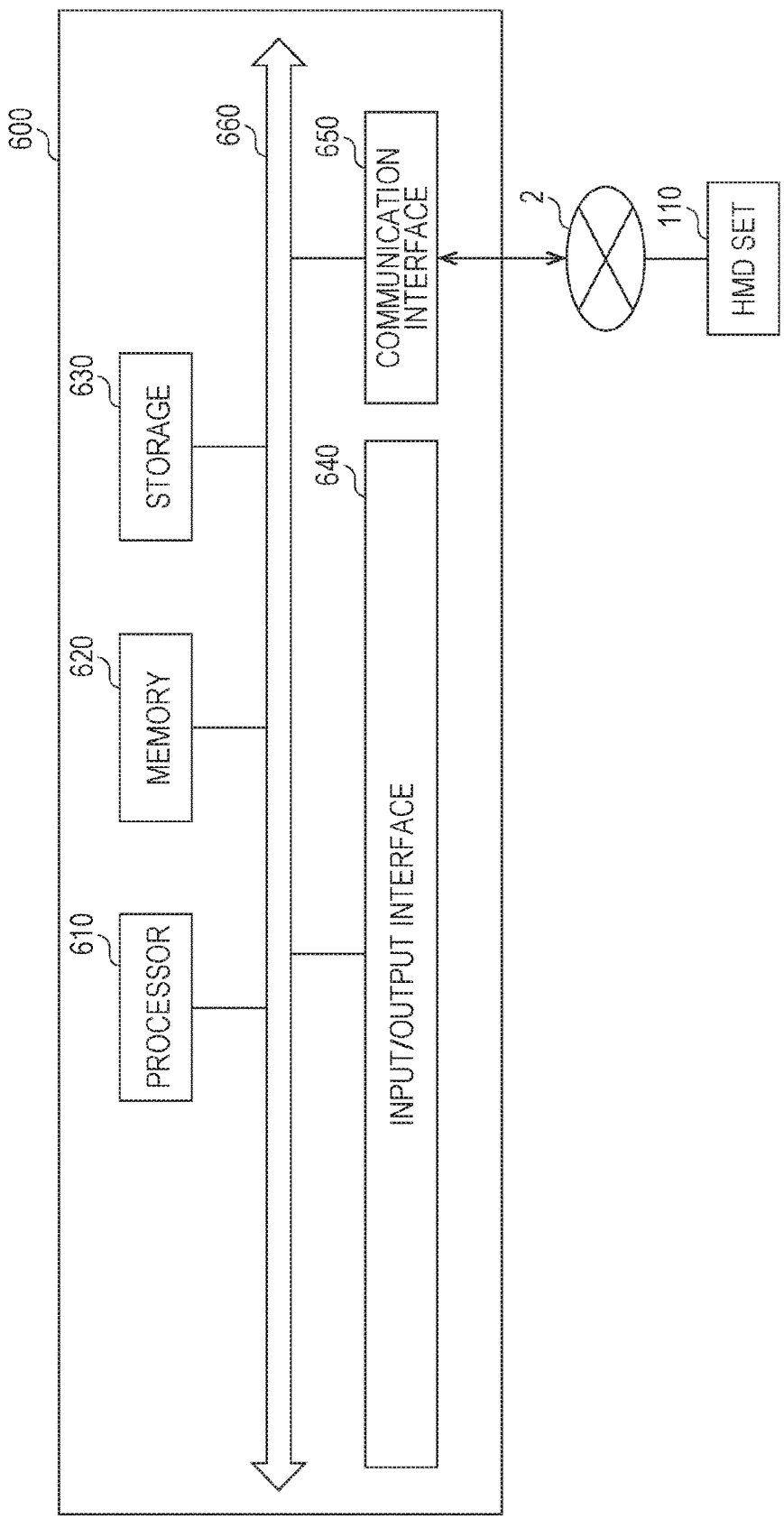
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
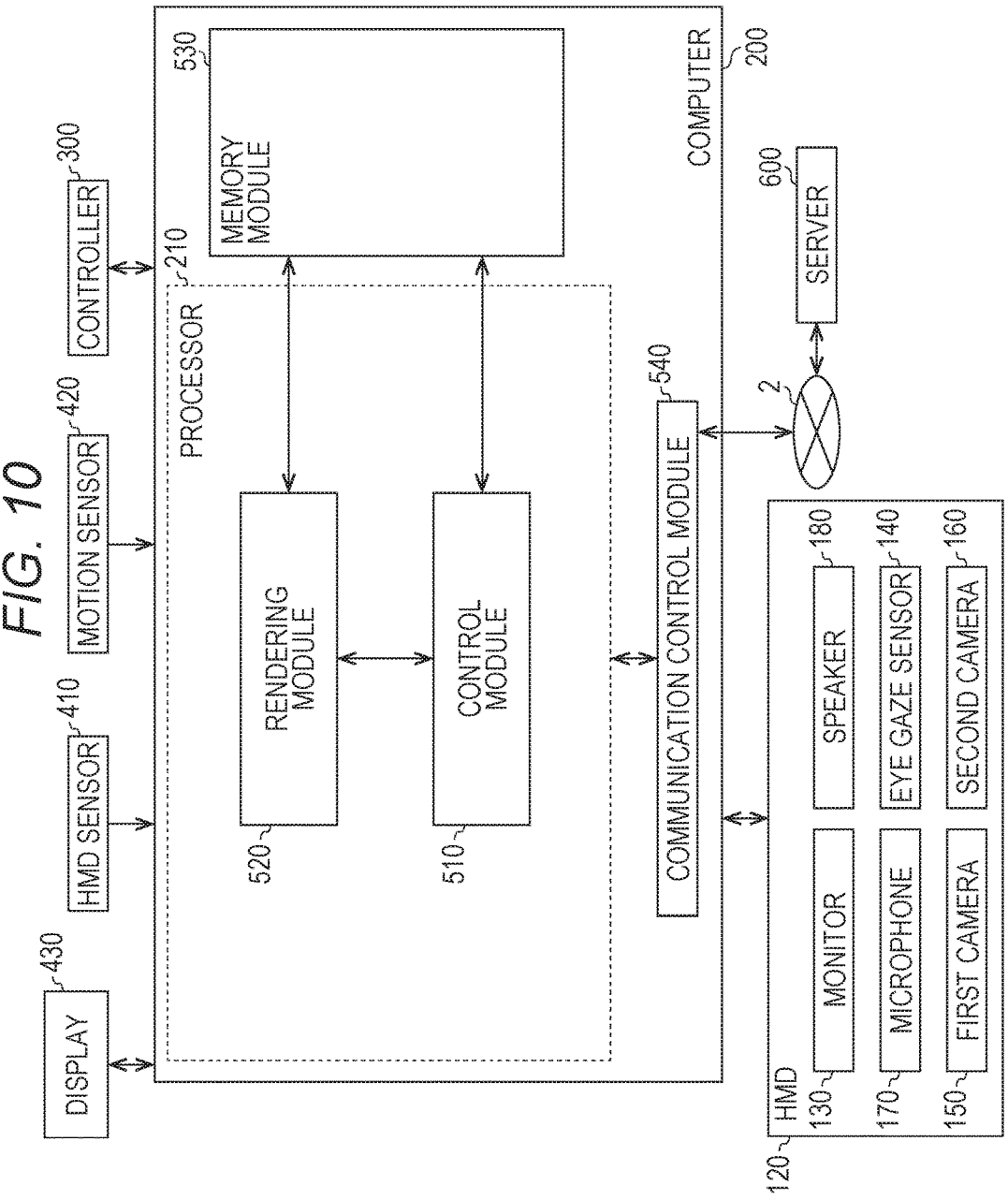
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity (R) provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
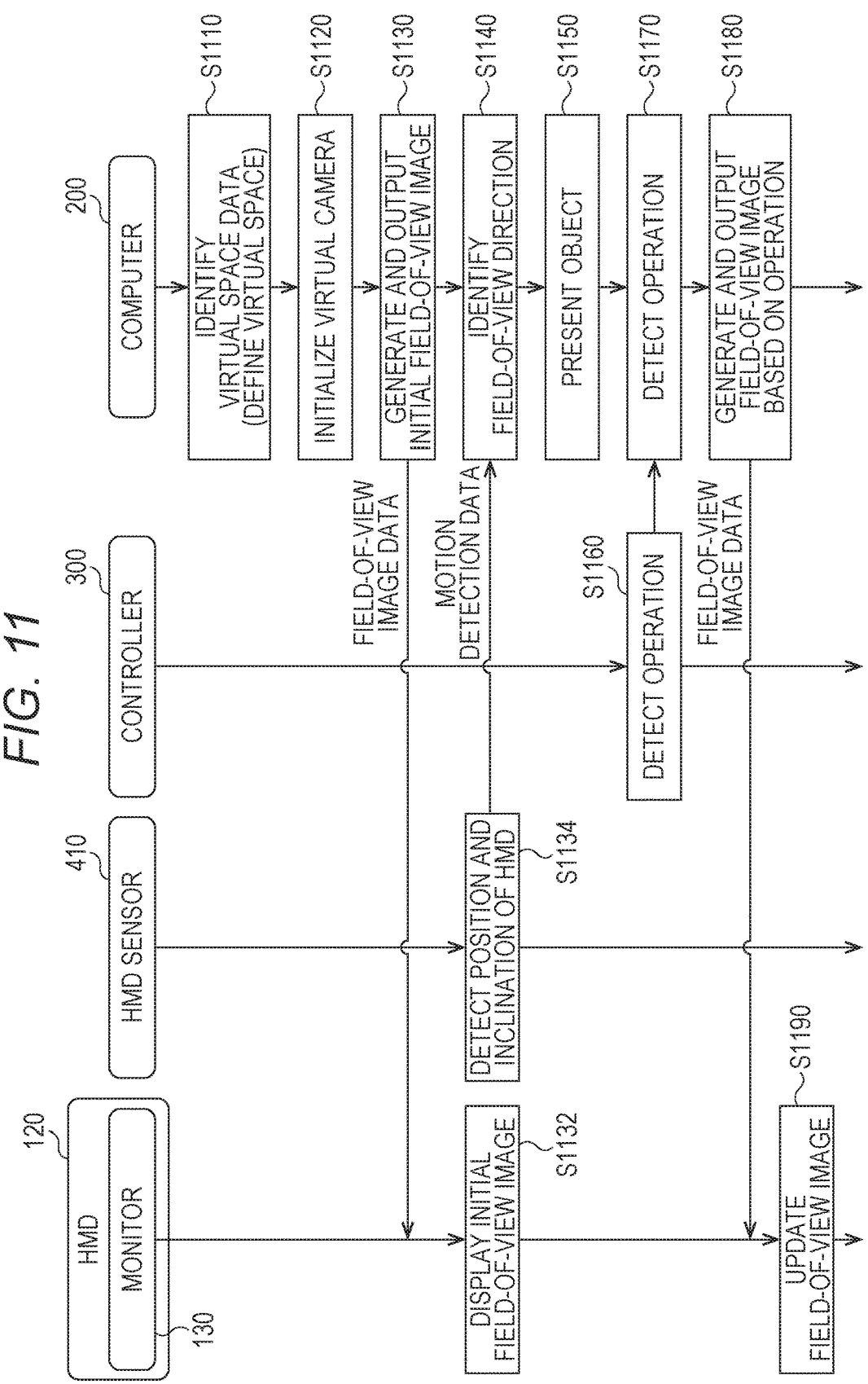
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
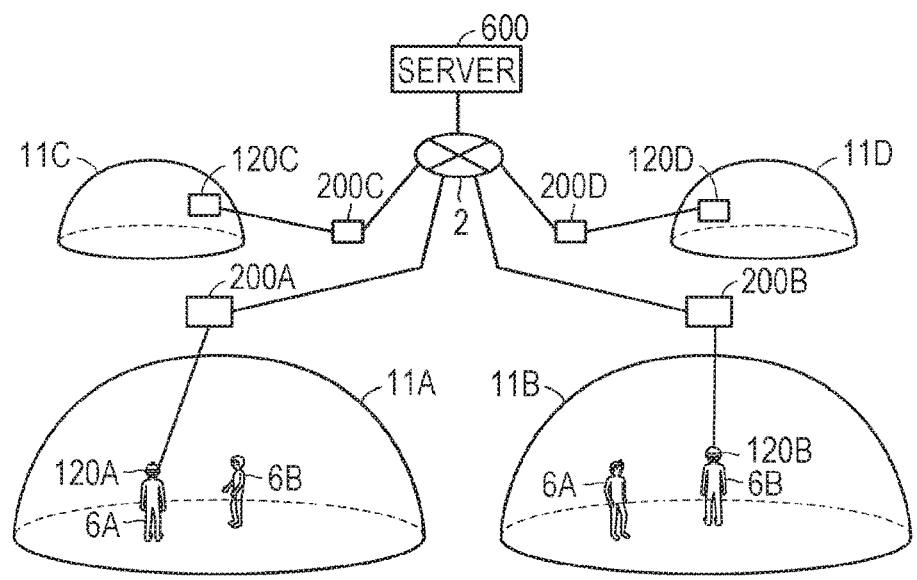
FIG. 12A A schematic diagram of HMD systems of several users sharing the virtual space interact using a network according to at least one embodiment of this disclosure.
Figure 12B:
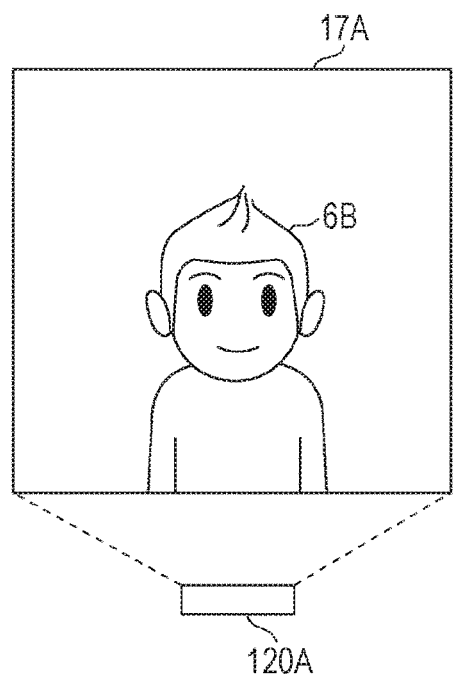
FIG. 12B A diagram of a field-of-view image of a user 5A in FIG. 12A according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
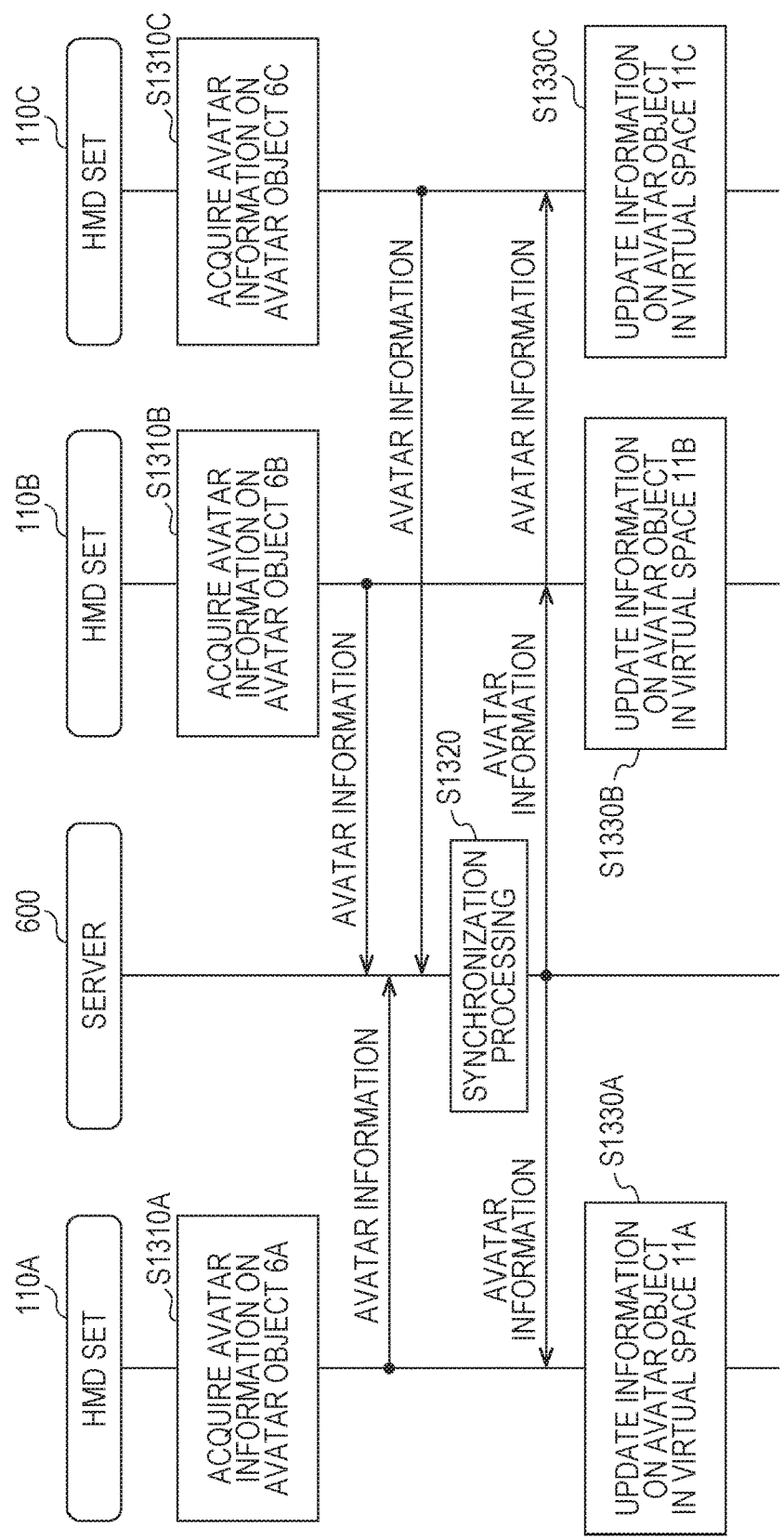
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
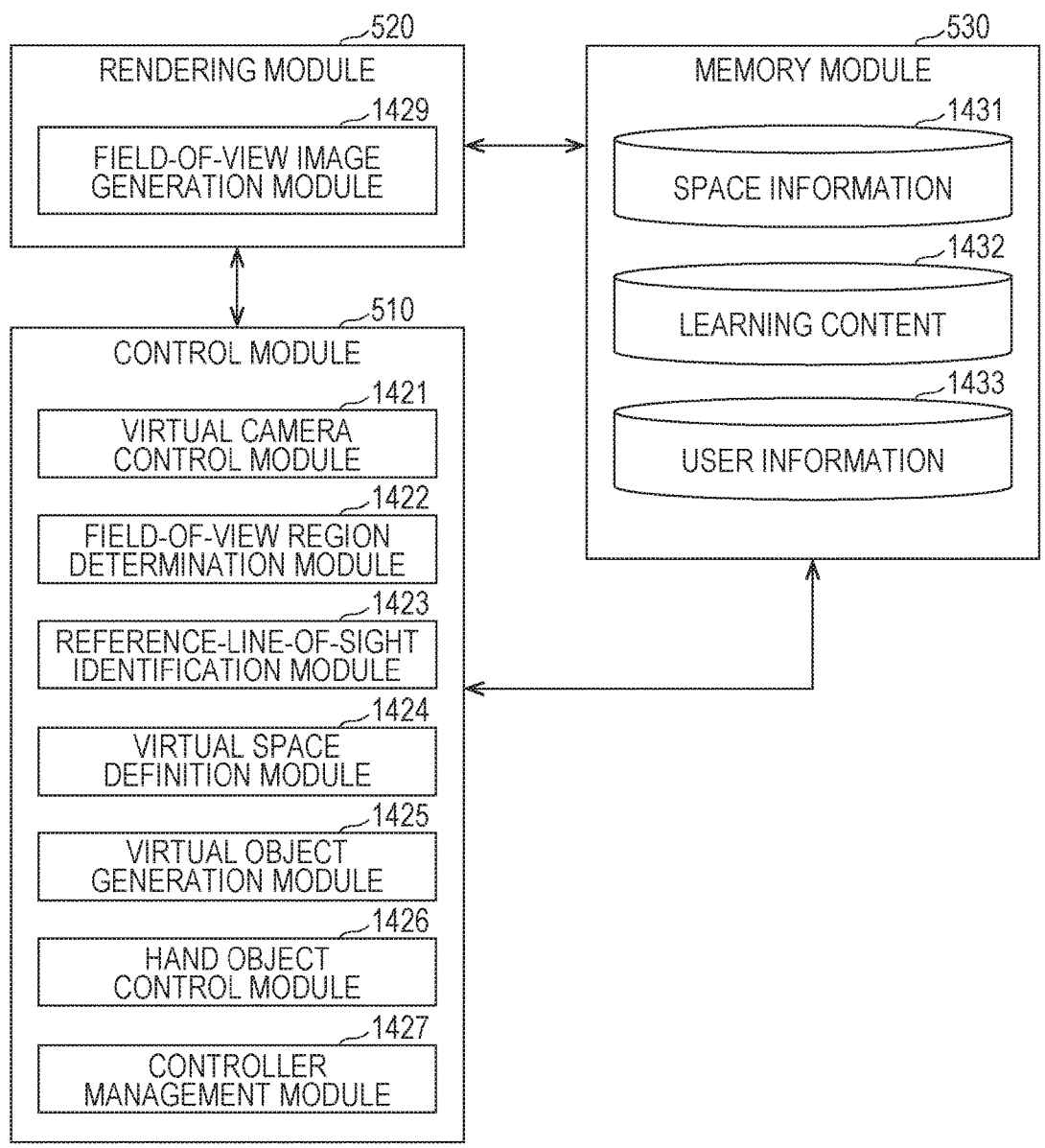
FIG. 14 A block diagram of a detailed configuration of modules of the computer according to at least one embodiment of this disclosure.

Now, with reference to FIG. 14, a description is given of a detailed configuration of modules of the computer 200. FIG. 14 is a block diagram of the detailed configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, a hand object control module 1426, and a controller management module 1427. The rendering module 520 includes a field-of-view image generation module 1429. The memory module 530 stores space information 1431, learning content 1432, and user information 1433.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15 in accordance with the direction of the head of the user 5 wearing the HMD 120. The field-of-view image generation module 1429 generates a field-of-view image 17 to be displayed on the monitor 130 based on the determined field-of-view region 15.

The field-of-view region determination module 1422 and the reference-line-of-sight identification module 1423 identify the line of sight of the user 5 based on the signal from the eye gaze sensor 140.

The control module 510 controls the virtual space 11 to be provided to the user 5. The virtual space definition module 1424 generates virtual space data representing the virtual space 11, to thereby define the virtual space 11 in the HMD set 110.

The virtual object generation module 1425 generates data on objects to be arranged in the virtual space 11. The objects include, for example, various situations to be used for learning a foreign language. Examples of such situations include, but are not limited to, airports, restaurants, banks, boutiques, hospitals, train stations, hotels, city halls, police stations, and the like.

The hand object management module 142 6 may arrange a hand object in the virtual space 11. The hand object corresponds to, for example, a right hand or a left hand of the user 5 holding the controller 300.

The controller management module 1427 receives the motion by the user 5 in the virtual space 11 and controls the controller object in accordance with that motion. In at least one embodiment of this disclosure, the controller object functions as a controller for issuing commands to another object arranged in the virtual space 11. In at least one aspect, the controller management module 1427 generates data for arranging in the virtual space 11 a controller object for receiving controls in the virtual space 11. When the HMD 120 receives this data, the monitor 130 may display the controller object.

The space information 1431 stores one or more templates that are defined to provide the virtual space 11.

The learning content 1432 includes a plurality of example sentences in English, Chinese, and other foreign languages. Each example sentence is data stored locally by the user 5. In at least one aspect, each example sentence is stored in a cloud storage (e.g., server 600). In at least one aspect, each of the plurality of example sentences is associated with one or more scenes in which that example sentence is to be used.

The user information 1433 contains, for example, identification information on the user 5 of the HMD 120 and an authority associated with the user 5.

[Data Structure of Server]

The data structure of the server 600 is now described in detail with reference to FIG. 15. FIG. 15 is a schematic diagram of one mode of storing data in the memory 620 of the server 600 according to at least one embodiment of this disclosure.

In at least one embodiment of this disclosure, the memory 620 stores tables 1010, 1020, and 1030. The table 1010 includes one or more example sentences corresponding to each situation. The table 1020 includes user information. The table 1030 includes a user-specific word list.

The table 1010 includes columns of a situation 1011, an example sentence ID 1012, and an example sentence 1013. The situation 1011 represents a scene in which a foreign language is used. The situation 1011 is defined, for example, by a creator of the content to be used in a service for supporting learning of a foreign language. The example sentence ID 1012 identifies the example sentence 1013. The example sentence 1013 is prepared by the creator of the content. In at least one aspect, the same example sentence is used for two or more different situations.

The table 1020 includes columns of a user name 1021, a user ID 1022, a registration date 1023, a final login date and time 1024, and a status 1025. The user name 1021 represents the user of the service. The user ID 1022 identifies the user. The registration date 1023 represents the date on which the user registered for the service. The final login date and time 1024 represents the date and time when the user last logged in to the service. The status 1025 indicates whether the user is currently online or offline.

The table 1030 includes columns of a user ID 1031, a situation 1032, an example sentence ID 1033, a word 1034, and a selection mode 1035. The user ID 1031 identifies the user who registered a word. The situation 1032 represents the situation in which the word is used. The example sentence ID 1033 identifies an example sentence including the word. The word 1034 represents the word registered by the user. The selection mode 1035 represents an operation mode at a time when the word is registered. The selection mode 1035 may include, for example, a user selection, an automatic selection, and an instructor selection. The user selection indicates that the word has been selected by the user. The automatic selection indicates that a word has been selected by the server 600. The instructor selection indicates that the word has been selected by the instructor of the user 5 (e.g., an English conversation teacher).

The processor 610 of the server 600 uses the data stored in the memory 620 to register a word for each user, or to present a registered word to the HMD 120.

[Control Structure]

With reference to FIG. 16, the control structure of the HMD set 110 according to at least one embodiment of this disclosure is described. FIG. 16 is a flowchart of processing to be executed by the HMD set 100 according to at least one embodiment of this disclosure.

In Step S1610, the processor 210 of the computer 200 serves as the virtual space definition module 1424 to identify virtual space image data and define the virtual space.

In Step S1620, the processor 210 initializes the virtual camera 14. For example, in a work area of the memory, the processor 210 arranges the virtual camera 14 at the center defined in advance in the virtual space 11, and matches the line of sight of the virtual camera 14 with the direction in which the user 5 faces.

In Step S1630, the processor 210 serves as the field-of-view image generation module 1429 to generate field-of-view image data for displaying an initial field-of-view image. The generated field-of-view image data is transmitted to the HMD 120 by a communication control module 540 via the field-of-view image generation module 1429.

In Step S1632, the monitor 130 of the HMD 120 displays the field-of-view image based on the field-of-view image data received from the computer 200. The user 5 wearing the HMD 120 may recognize the virtual space 11 through visual recognition of the field-of-view image.

In Step S1634, the HMD sensor 410 detects the position and the inclination of the HMD 120 based on a plurality of infrared rays emitted from the HMD 120. The detection results are transmitted to the computer 200 as motion detection data.

In Step S1640, the processor 210 identifies a field-of-view direction of the user 5 wearing the HMD 120 based on the position and inclination of the HMD 120. The processor 210 executes an application program, and arranges an object in the virtual space 11 based on a command contained in the application program.

In Step S1642, the controller 300 detects motion of the user 5 based on a signal output from the motion sensor 420. In at least one aspect, the motion of the user 5 is detected based on an image from a camera arranged around the user 5.

In Step S1650, the processor 210 receives, based on motion by the user 5, an instruction to activate an application for supporting learning of a foreign language. This instruction is transmitted to the server 600. When the server 600 activates the application, data for displaying a learning screen is transmitted from the server 600 to the computer 200. When the computer 200 transmits the data to the HMD 120, the user 5 may visually recognize the foreign language learning screen in the virtual space 11.

In Step S1660, the processor 210 receives, based on motion by the user 5, a selection of the situation the user 5 wishes to learn. For example, when the user 5 operates the controller 300 and selects a situation from a menu screen presented in the virtual space, data representing the selected situation is transmitted to the server 600. When the server 600 receives that data, the server 600 transmits the data of the example sentences associated with the situation to the computer 200.

In Step S1670, the processor 210 generates data for displaying an example sentence, and transmits the generated data as field-of-view image data to the HMD 120.

In Step S1672, when the HMD 120 receives the field-of-view image data, the HMD 120 causes the monitor 130 to update the field-of-view image.

In Step S1674, the controller 300 detects motion by the user 5 based on a signal output from the motion sensor 420. Similar to the case of Step S1642, in at least one aspect, the motion by the user 5 is also detected based on an image from a camera arranged around the user 5. In this case, the motion by the user 5 may be, for example, selection of a selected word in a situation selected by the user 5. When the user 5 selects a word in the virtual space, data identifying the selected word is transmitted to the server 600.

In Step S1680, the processor 210 detects an instruction for storing the word selected by the user 5 in the word list. When this instruction is detected, the computer 200 transmits to the server 600 the user ID and an instruction to store the word. The server 600 stores the word as a word associated with the user 5 in a word list (e.g., table 1030) based on that instruction. When storage of the word is complete, the server 600 transmits a message notifying that fact to the computer 200.

In Step S1690, the processor 210 generates a message indicating that the word has been stored, and transmits the generated message to the HMD 120 as field-of-view image data.

In Step S1692, the HMD 120 updates the field-of-view image based on the received field-of-view image data, and displays the updated field-of-view image on the monitor 130. Based on the message, the user 5 recognizes that the selected word has been stored.

The notification that storage of the word is complete is not limited to a message. For example, in at least one aspect, a signal indicating that the word has been stored is transmitted to the controller 300, and the controller 300 vibrates based on that signal.

Figure 17:
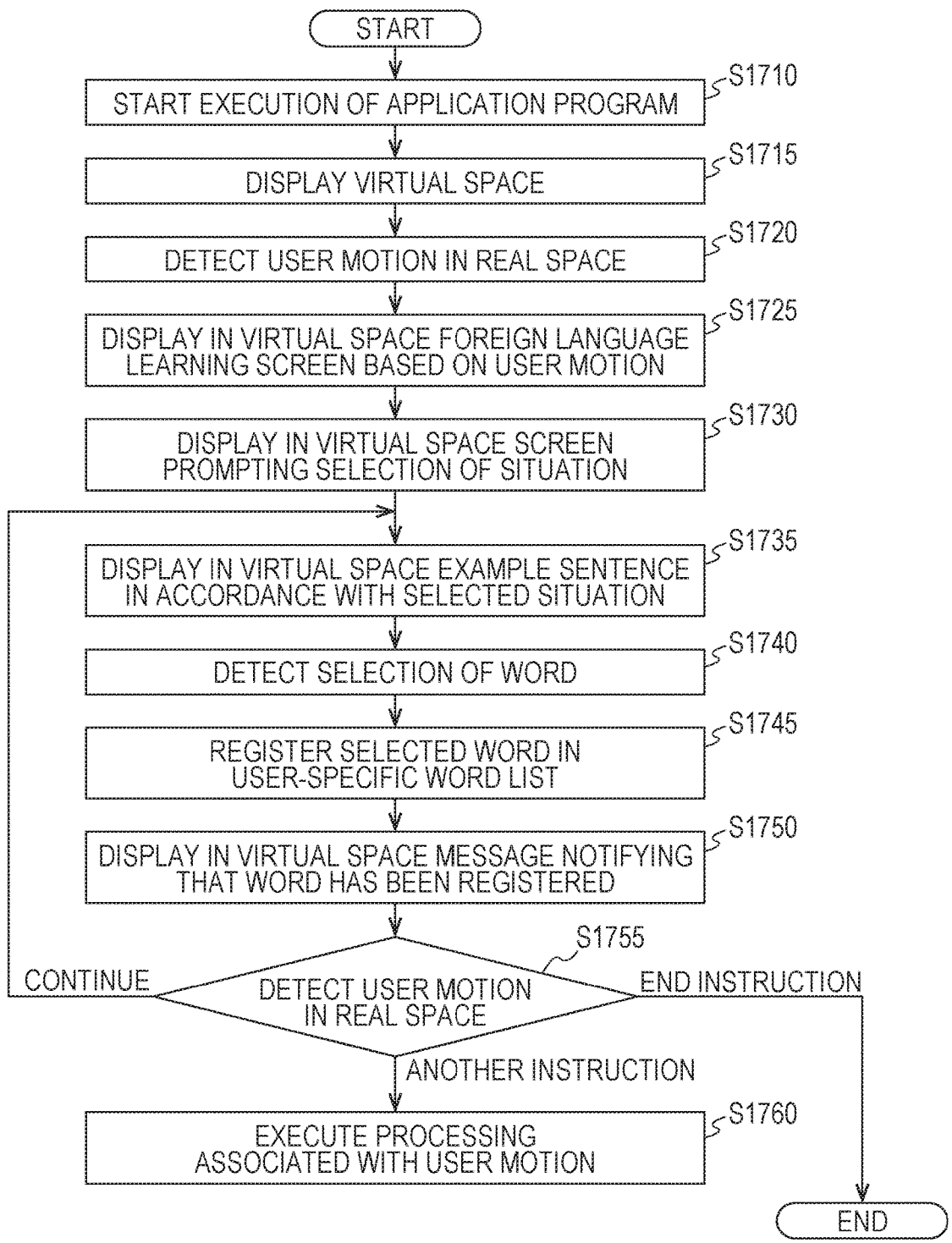
FIG. 17 A flowchart of processing executed by the server according to at least one embodiment of this disclosure.

With reference to FIG. 17, a description is given in detail of a control structure of the server 600. FIG. 17 is a flowchart of processing to be executed by the server 600 according to at least one embodiment of this disclosure.

In Step S1710, the processor 610 starts execution of an application program based on an instruction given by the user 5.

In Step S1715, the processor 610 generates data for displaying the virtual space on the HMD 120, and transmits the generated data to the HMD 120 via the computer 200.

In Step S1720, the processor 610 detects motion of the user 5 in the real space based on the signal transmitted from the controller 300. For example, the processor 610 detects input of login information for accessing a service for supporting foreign language learning. The login information may be, for example, a registered user ID and password.

In Step S1725, the processor 610 determines whether or not the user 5 is a registered user based on the login information transmitted from the user 5 and the user information (e.g., table 1020) registered in the server 600. When the user 5 is a registered user, the processor 610 generates data for displaying the foreign language learning screen in the virtual space presented by the HMD 120 worn by the user 5, and transmits the generated data to the HMD 120.

In Step S1730, the processor 610 generates data for displaying in the virtual space a screen prompting situation selection, and transmits the generated data to the HMD 120. When the user 5 selects a situation in the virtual space, information for identifying the selected situation is transmitted from the HMD 120 to the server 600.

In Step S1735, the processor 610 displays in the virtual space of the HMD 120 an example sentence corresponding to the situation selected by the user 5. When the user 5 operates the controller 300 and selects a word from the example sentence, data identifying that word is transmitted to the server 600.

In Step S1740, the processor 610 detects that a word has been selected by the user 5.

In Step S1745, the processor 610 stores the word selected by the user 5 in a word list (e.g., table 1030) for each user.

In Step S1750, the processor 610 generates data for displaying in the virtual space a message notifying that the word has been registered, and transmits the generated data to the HMD 120 via the computer 200. When the HMD 120 receives the data, a message is displayed on the monitor 130. The user 5 is able to recognize the message in the virtual space.

In Step S1755, the processor 610 detects motion by the user 5 in the real space based on a signal from the controller 300. When the motion is an instruction to continue the application, the control returns to Step S1735. When the motion is an instruction to end the application, the application program ends. When the motion is another instruction, the control advances to Step S1760.

In Step S1760, the processor 610 executes the processing associated with the motion.

Figure 18:
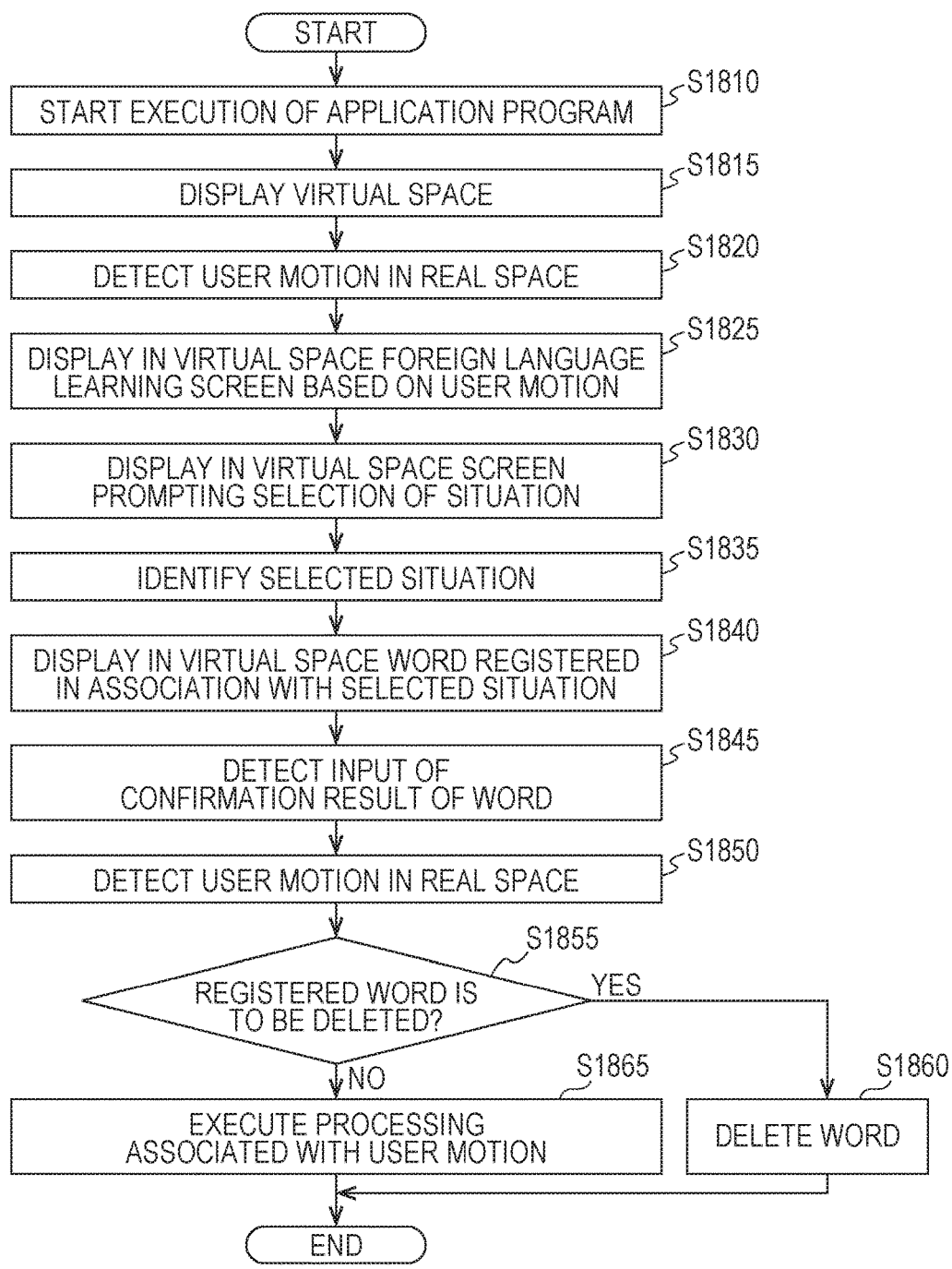
FIG. 18 A flowchart of processing executed in response to a processor of a server reading a word according to at least one embodiment of this disclosure.

The control structure of the server 600 is now further described with reference to FIG. 18. FIG. 18 is a flowchart of processing executed in response to the processor 610 of the server reading a word according to at least one embodiment of this disclosure.

In Step S1810, the processor 610 starts execution of the application program based on detection of an instruction by the user 5 to read a word.

In Step S1815, the processor 610 generates data for displaying the virtual space, and transmits the generated data to the HMD 120 via the computer 200.

In Step S1820, the processor 610 detects motion of the user in the real space based on the signal transmitted from the controller 300.

In Step S1825, the processor 610 displays the foreign language learning screen in the virtual space based on the motion by the user 5.

In Step S1830, the processor 610 displays in the virtual space, based on motion by the user 5, a screen prompting selection of a situation to learn a foreign language. The screen may be, for example, a screen displaying icons representing each of a plurality of situations in a menu format. When the user 5 wearing the HMD 120 operates the controller 300 and selects a situation (e.g., airport), data for identifying the selected situation is transmitted from the HMD 120 to the server 600.

In Step S1835, the processor 610 identifies the situation selected by the user 5 based on the situation ID included in the signal from the HMD 120.

In Step S1840, the processor 610 reads the word registered associated with the selected situation from the memory module 620, and generates data for displaying that word in the virtual space. The generated data is transmitted to the HMD 120. When the HMD 120 receives the data, the monitor 130 displays the word. The user 5 is able to recognize the word displayed in the virtual space. For example, when the user 5 has registered a word he/she wishes to memorize, that word may be displayed in the virtual space. When that word is easily recollected by the user 5, the user 5 operates the controller 300 and, for example, may select a "confirmed" icon displayed in the virtual space. A signal representing the selection is transmitted to the server 600 from the HMD 120 that received the input of the controller 300.

In Step S1845, when the signal transmitted from the HMD 120 is received, the processor 610 detects that a confirmation result of the word has been input. Based on the signal, the processor 610 changes the status of that word associated with the user 5, for example, from "memorization required" to "memorized".

In Step S1850, the processor 610 detects motion by the user 5 in the real space based on a signal from the HMD 120. For example, when the user 5 operates the controller 300, a signal corresponding to that operation is transmitted from the HMD 120. More specifically, in at least one aspect, when the user 5 operates the controller 300 and inputs a command to delete a learned word to the controller 300, the HMD 120, which has received the input from the controller 300, transmits to the server 600 a signal including the command and identification data on the word. When the user inputs another command to the controller 300, a signal corresponding to that command is transmitted from the HMD 120 to the server 600.

In Step S1855, the processor 610 determines whether or not to delete the registered word based on a signal transmitted from the HMD 120 in accordance with motion by the user 5. In response to the processor 610 confirming that the signal is an instruction to delete the word (YES in Step S1855), the processor 610 switches the control to Step S1860. Meanwhile, when the processor 610 confirms that the signal is not an instruction to delete the word (NO in Step S1855), the processor 610 switches the control to Step S1865.

In Step S1860, the processor 610 deletes a record including the word that had been registered in the word list (e.g., table 1030).

In Step S1865, the processor 610 executes another process associated with motion by the user 5.

Figure 19:
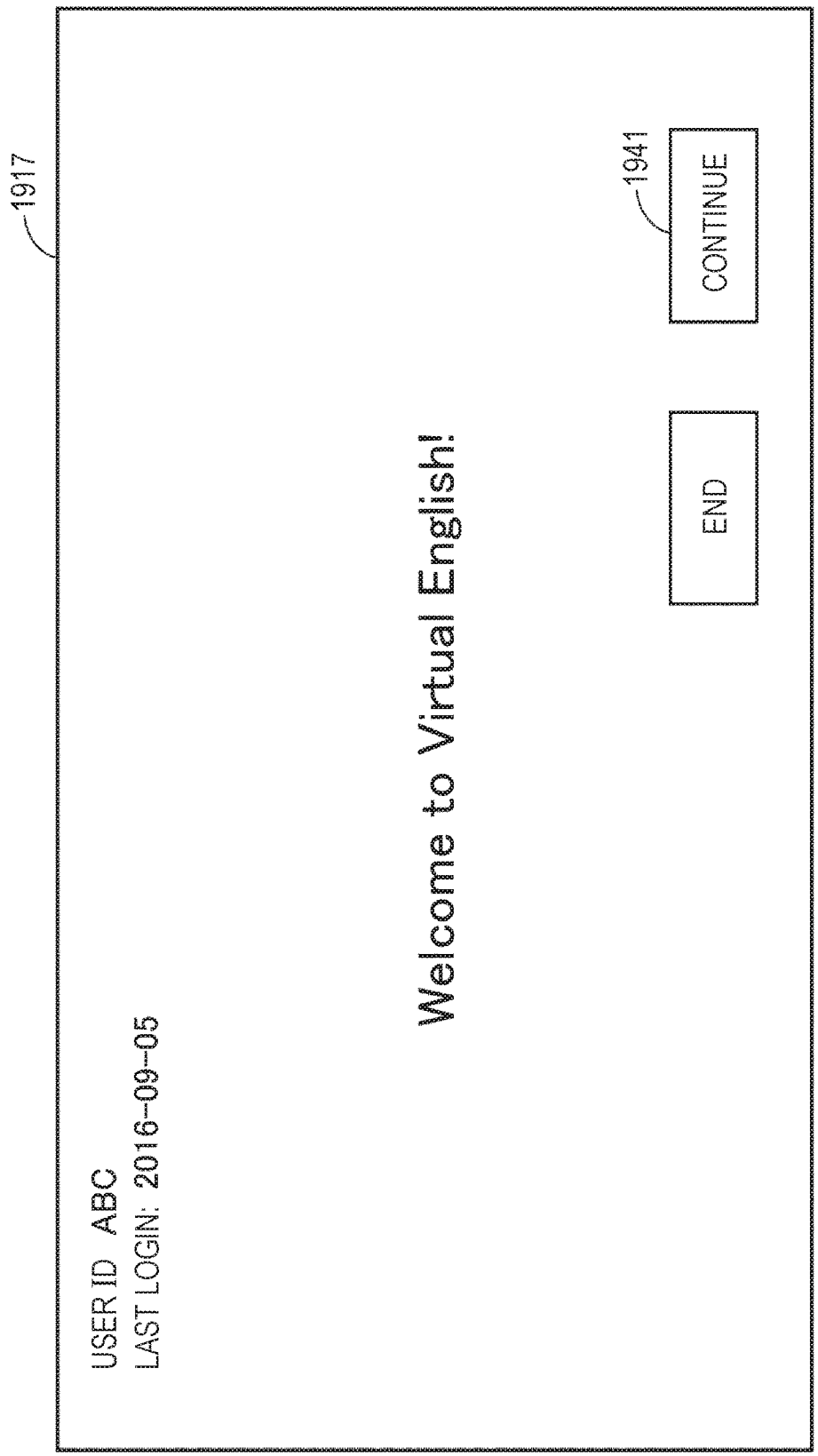
FIG. 19 A diagram of a field-of-view image displayed on a monitor according to at least one embodiment of this disclosure.

Screens displayed to the user 5 are now described with reference to FIG. 19 to FIG. 25. FIG. 19 is a diagram of a field-of-view image 1917 displayed on the monitor 130 according to at least one embodiment of this disclosure. The field-of-view image 1917 represents, for example, an initial screen of an application program for learning a foreign language in the virtual space. The initial screen is displayed, for example, when input by the user 5 of the user ID and the password is complete and authentication is successful.

In the example of FIG. 19, there is displayed a screen for learning English. The screen includes the user ID (=ABC) of the user 5 and the date and time of the last time the user logged in. When the user 5 selects an icon 1941 and inputs an instruction "continue", the field-of-view image 1917 switches to the screen for selecting a situation.

Figure 20:
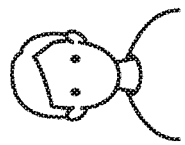
FIG. 20 A diagram of a field-of-view image for prompting selection of any one situation from a plurality of situations according to at least one embodiment of this disclosure.

In FIG. 20, there is a field-of-view image 2017 for prompting selection of any one situation from a plurality of situations. The field-of-view image 2017 is displayed on the monitor 130 based on a signal received from the server 600. A plurality of situations are prepared in advance by the provider of the service. In at least one aspect, one or more situations is presented as initial candidates in accordance with a preference selected by the user 5. In at least one aspect, the user 5 selects a situation as desired.

In the example in FIG. 20, when the user 5 operates the controller 300 and selects an icon 2042, "airport" is selected as the situation. A signal indicating that "airport" has been selected as the situation is transmitted from the HMD 120 to the server 600. Then, example sentences corresponding to the selected situation are transmitted from the server 600 to the HMD 120. The HMD 120 displays each example sentence on the monitor 130.

Figure 21:
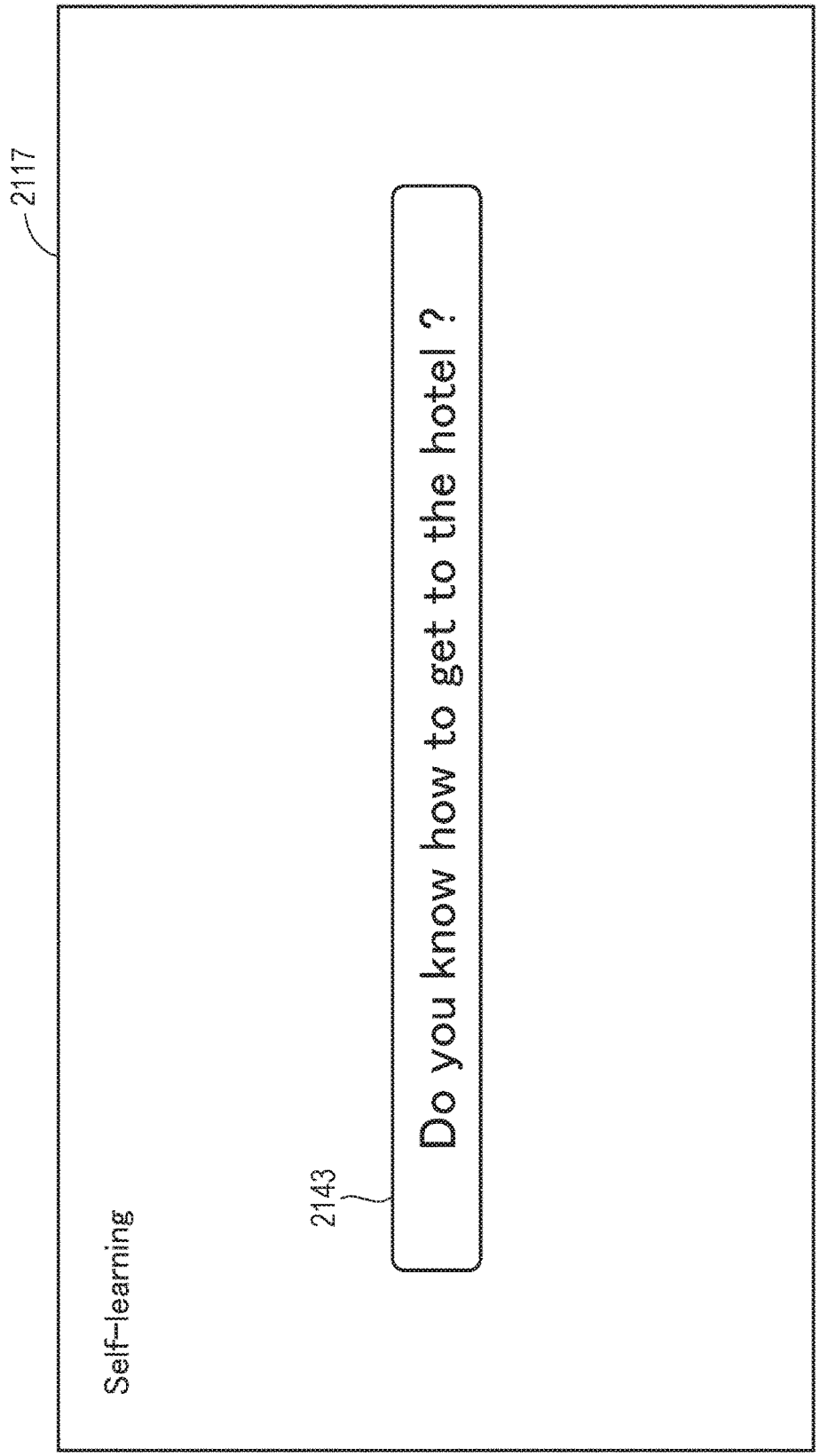
FIG. 21 A diagram of a visual image for supporting self-learning according to at least one embodiment of this disclosure.

In FIG. 21, there is a visual image 2117 for supporting self-learning according to at least one embodiment of this disclosure. For example, in a case in which a self-learning mode and an automatic mode are defined in advance as the learning modes of the foreign language, when the user 5 selects the self-learning mode, the server 600 displays an example sentence 2143 corresponding to the selection result. When the user 5 visually recognizes the example sentence 2143 and recognizes an unknown word, the user 5 is able to select that word. For example, the user 5 is able to select the word by operating the controller 300 and placing a pointer object on the example sentence 2143 presented in the virtual space. In at least one aspect, the user 5 directs his/her line of sight at the example sentence 2143, places his/her point of gaze on a word, and selects that word in accordance with a detection result of the sight line at that time. The method of selecting a word based on the line of sight of the user 5 may be performed by, for example, selecting the word in accordance with the line of sight of the user 5 detected based on output from the eye gaze sensor 140, or selecting the word by taking a reference line of sight 16 determined based on the direction of the virtual camera 14 (i.e., direction determined by movement of the head of the user wearing the HMD 120) to be the line of sight of the user 5. For example, a word may be determined as having been selected when the word and an icon indicating the reference line of sight 16 displayed on the monitor 130 overlap for a fixed period or more.

Figure 22:
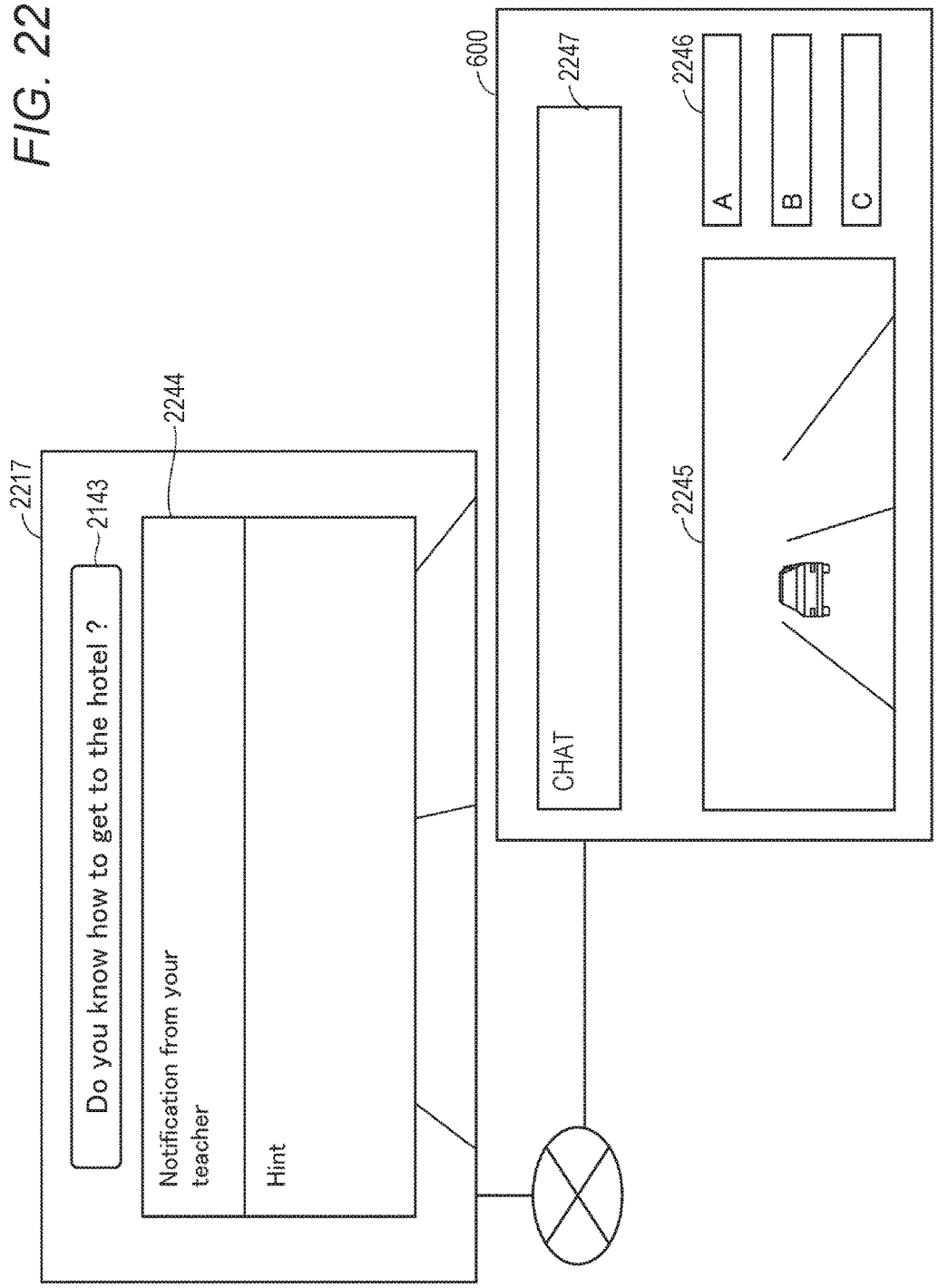
FIG. 22 A diagram of an example of a mode in which the user learns in a chat format while receiving instruction from a teacher according to at least one embodiment of this disclosure.

In FIG. 22, there is an example of a mode in which the user 5 learns in a chat format while receiving instruction from a teacher according to at least one embodiment of this disclosure. For example, the HMD 120 presenting a field-of-view image 2217 is connected to the server 600. The user 5 wearing the HMD 120 visually recognizes the field-of-view image 2217. The server 600 is used by the teacher.

In the HMD 120, the field-of-view image 2217 includes an example sentence 2143 and a message 2244. The message 2244 may include a comment (chat) and a hint from the teacher. For example, when the teacher using the server 600 operates a keyboard to input a message and a hint, and designates a destination, the message and the hint are transmitted to only the user 5.

In the server 600, the monitor to be viewed by the teacher includes an area 2245 for transferring students (for example, user 5), an area 2246 representing logged-in users, and an area 2247 for receiving input of a chat. The area 2245 may display, for example, an image photographed by a camera arranged near the user 5. When a user is selected by the teacher, the area 2246 receives an instruction to transmit comments and hints to only the selected user. The area 2247 receives comments and chat inputs from a keyboard or via speech.

Figure 23:
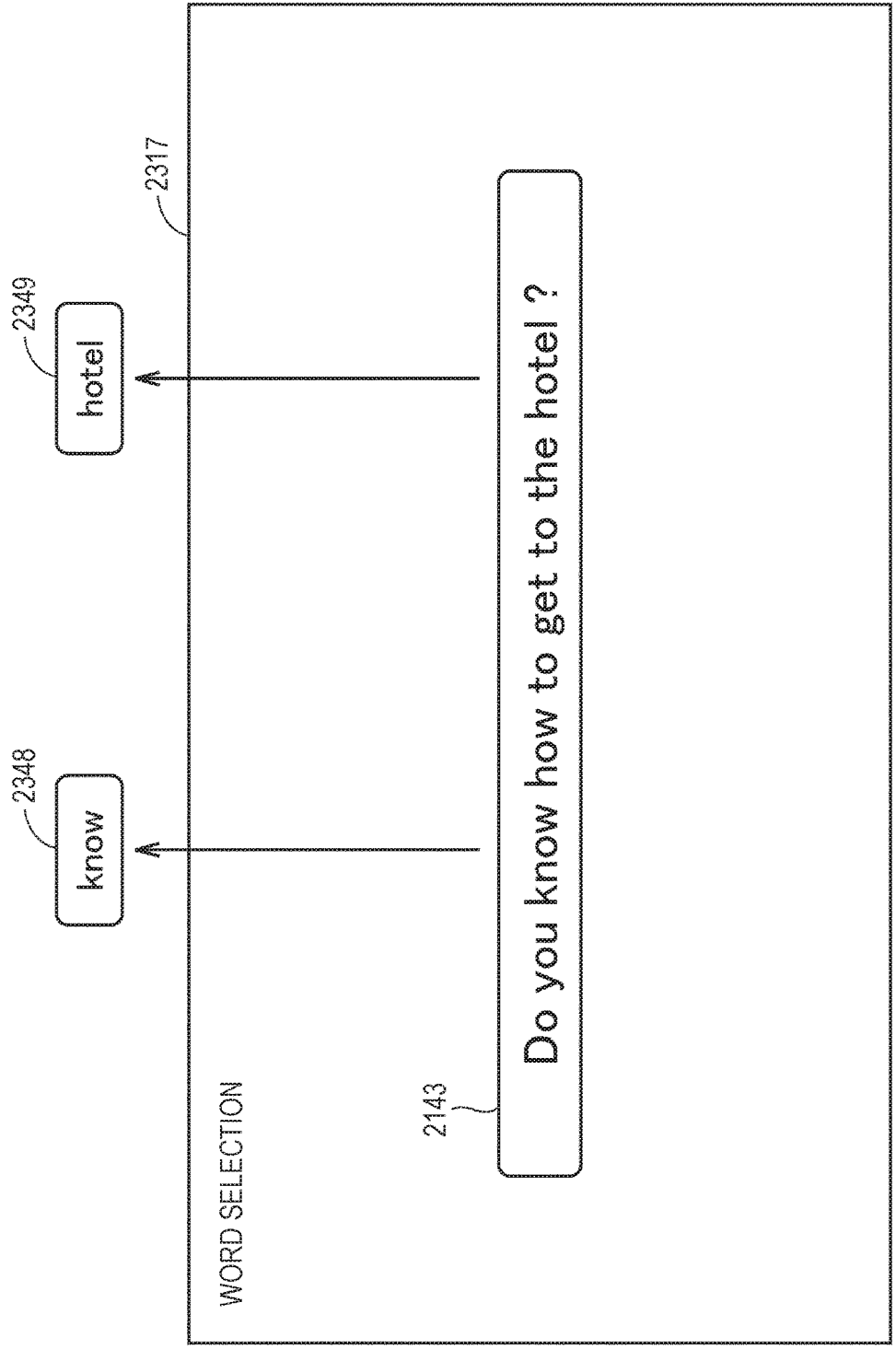
FIG. 23 A diagram of a mode in which a word is selected from a field-of-view image presented on the HMD according to at least one embodiment of this disclosure.

A mode of selecting a word from an example sentence is now described with reference to FIG. 23. FIG. 23 is a diagram of a mode in which a word is selected from the field-of-view image 2317 presented on the HMD 120 according to at least one embodiment of this disclosure.

In at least one aspect, the field-of-view image 2317 includes an example sentence 2143. In this case, the HMD 120 divides the example sentence 2143 into words by using the spaces (i.e., gaps between words) included in the example sentence 2143 transmitted from the server 600, and temporarily stores each word as text data. The example sentence 2143 is arranged in the virtual space as a set of word objects based on such text data.

When the user 5 operates the controller 300 or performs another motion in the real space, a pointer corresponding to that motion is presented in the virtual space. When a predetermined determination button is pressed on the controller 300 while the pointer overlaps a word object, that word object is selected as a word to be registered in the word list, and is stored in the word list (e.g., table 1030).

In at least one aspect, when a hand object is presented in the virtual space in accordance with operation of the controller 300 by the user 5, the hand object holds the word object. In this case, the word corresponding to the word object held by the hand object is stored in the word list (table 1030).

In the example in FIG. 23, word objects 2348 and 2349 are selected as words to be registered in the word list.

Figure 24:
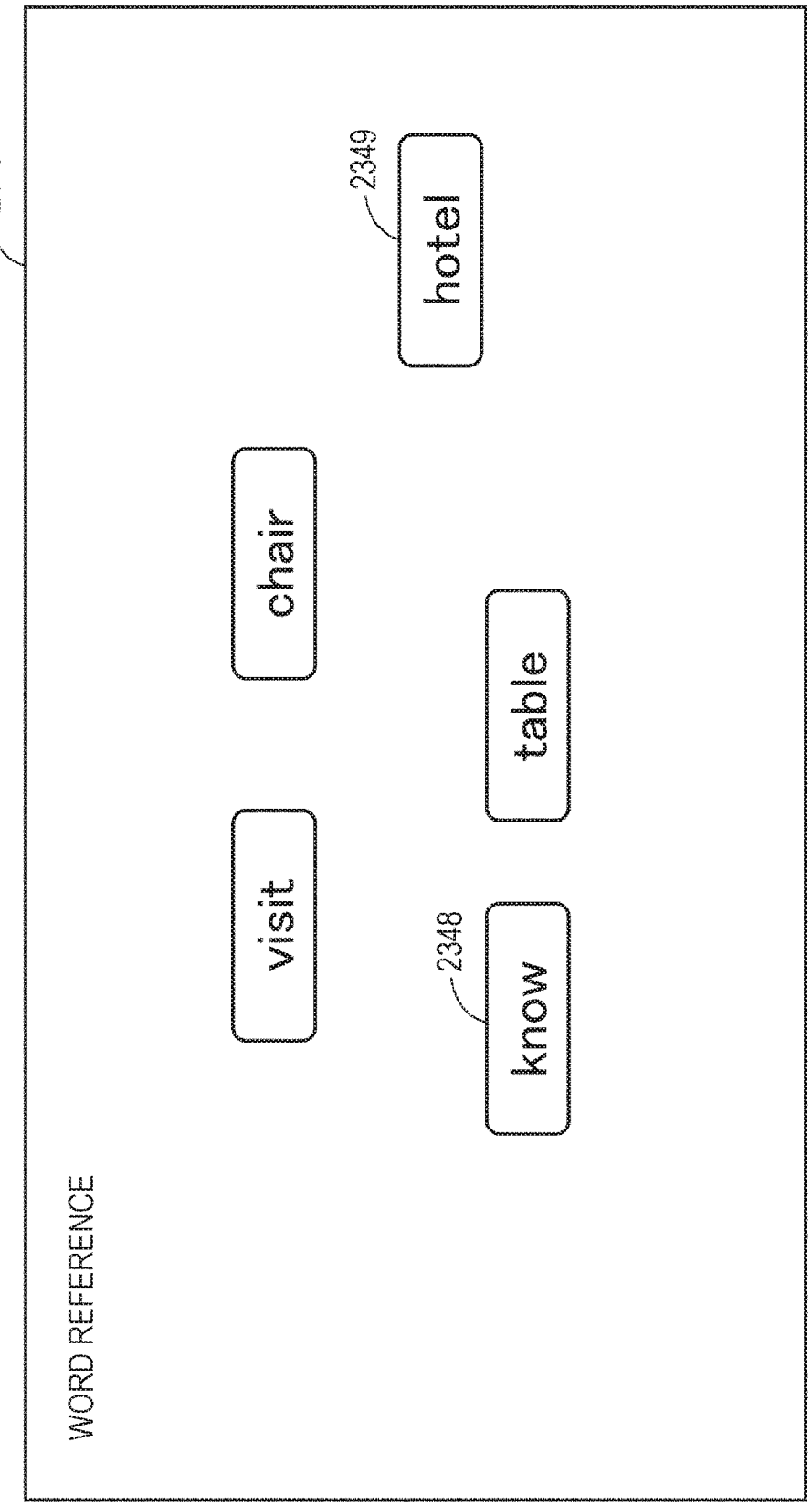
FIG. 24 A schematic diagram of a mode in which a word object is presented in the field-of-view image according to at least one embodiment of this disclosure.

Viewing of the words registered in the word list is now described with reference to FIG. 24. FIG. 24 is a schematic diagram of a mode in which a word object is presented in the field-of-view image 2417 according to at least one embodiment of this disclosure.

The user 5 may also temporarily stop the learning of the foreign language and resume the learning on another day. In that case, when there are words registered in the word list, based on the database accumulated for the user who logs in on the another day, the server 600 reads those words and transmits the word data to the HMD 120. The HMD 120 may present word objects based on that data in the virtual space. For example, when the user 5 selects a situation and instructs the HMD 120 to refer to a word, the instruction is transmitted from the HMD 120 to the server 600. In response to that instruction, the server 600 reads the word associated with the situation selected by the user 5 from the table 1030, and transmits the word data to the HMD 120.

In the example in FIG. 24, the field-of-view image 2417 presents five word objects previously registered during learning of a specific situation (e.g., airport). Of those five word objects, the word objects 2348 and 2349 correspond to the words registered by the user 5 at the time of learning (FIG. 23). In such a configuration, even when learning is interrupted, each user is able to easily refer to the words that have been registered so far, and hence learning can be resumed seamlessly.

Figure 25:
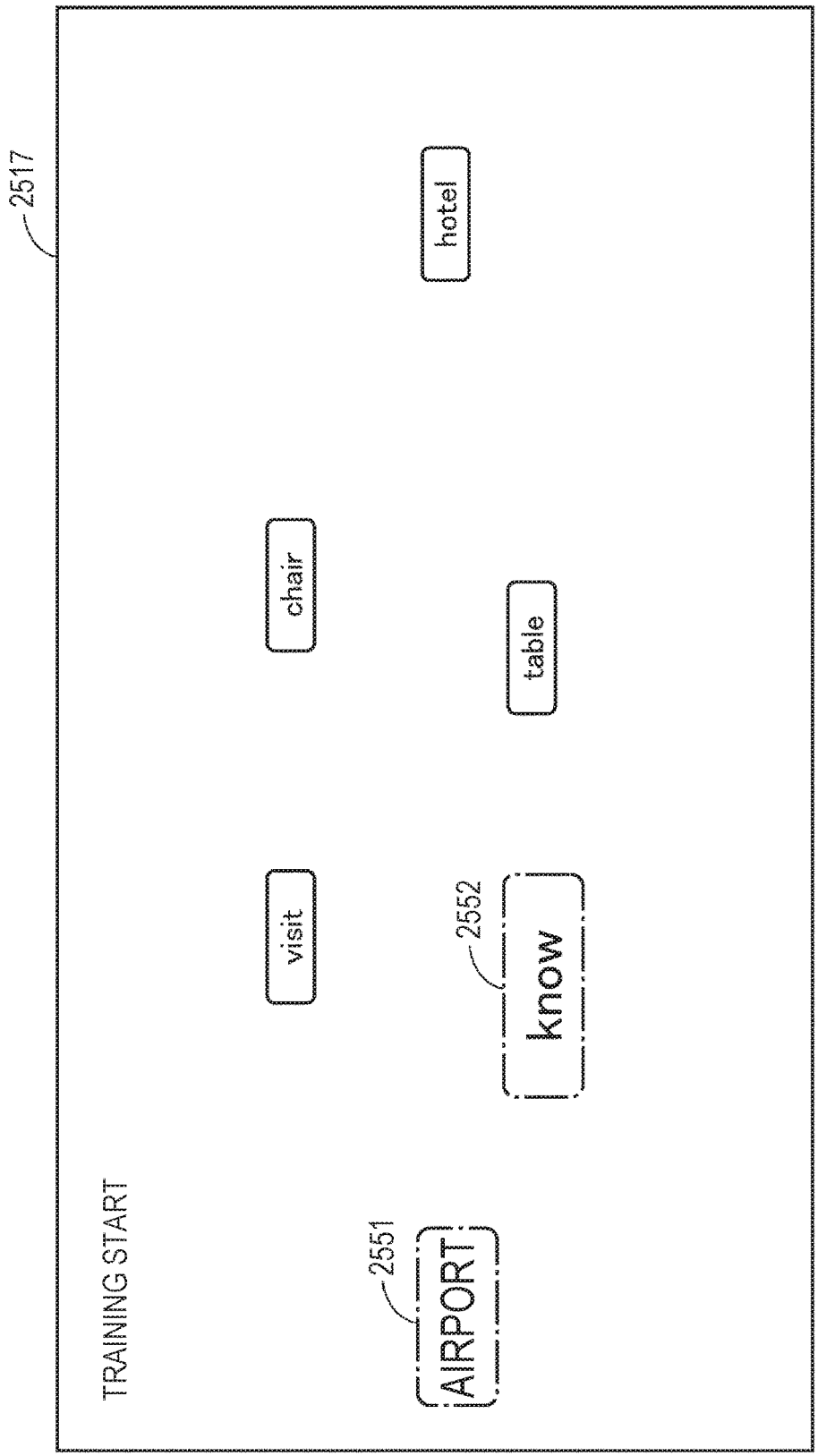
FIG. 25 A diagram of a field-of-view image in response to starting of learning in the situation selected by the user according to at least one embodiment of this disclosure.

Training for each separate situation is now described with reference to FIG. 25. FIG. 25 is a diagram of a field-of-view image 2517 at a time when learning is started in the situation selected by the user 5 according to at least one embodiment of this disclosure.

When the user 5 selects on the menu screen of the application program to start training, a situation selection screen is presented in the virtual space. When the user 5 selects "airport" as the situation, the data representing the selected situation is transmitted to the server 600. The server 600 reads a word associated with the situation "airport" based on the identification data of the user 5 and the data identifying the situation, and transmits the data (e.g., text data) of that word to the HMD 120. When the HMD 120 receives the data from the server 600, the HMD 120 presents an object 2551 representing the situation and an object 2552 of the word associated with the situation in a virtual space in a mode different from the display mode of other objects.

<Conclusion>

The technical features of at least one embodiment disclosed above are summarized in the following manner, for example.

(Configuration 1)

According to at least one embodiment of this disclosure, there is provided a method to be executed on a computer (e.g., server 600) to display content in a virtual space 11. The method includes selecting, based on motion by a user 5 wearing an HMD 120, a situation to be developed in a virtual space 11 from among a plurality of situations (airport, restaurant, and other situations) defined in advance. The method further includes presenting, based on motion by the user 5, one or more words associated with the situation. The method further includes selecting any one of the one or more words based on an instruction issued to the server 600. The method further includes registering the selected situation and the selected word in a word list (e.g., table 1030).

(Configuration 2)

According to at least one embodiment of this disclosure, the method further includes presenting a word registered in the word list in the virtual space 11.

(Configuration 3)

According to at least one embodiment of this disclosure, the method further includes selecting a situation for learning a word from among the plurality of situations. The method further includes presenting a word associated with the selected situation in the virtual space 11.

(Configuration 4)

According to at least one embodiment of this disclosure, the selecting of any one of the one or more words includes presenting in the virtual space 11 an object (e.g., point-of-gaze object and virtual hand object) based on motion by the user 5 in the real space. The method further includes selecting, by the object, the word to be selected, based on motion by the user 5.

(Configuration 5)

According to at least one embodiment of this disclosure, the selecting of any one of the one or more words includes detecting a line of sight of the user 5; and identifying a word at which the line of sight of the user 5 is directed.

(Configuration 6)

According to at least one embodiment of this disclosure, the selecting of any one of the one or more words includes selecting the word based on a command by an instructor of the user 5.

(Configuration 7)

According to at least one embodiment of this disclosure, the selecting of any one of the one or more words includes selecting a word that fails to satisfy an answer criterion determined in advance. For example, a word that is frequently mistaken by the user 5 is selected as the word to be stored in the word list.

(Configuration 8)

According to at least one embodiment of this disclosure, the method further includes presenting a hint for one or more words.

(Configuration 9)

According to at least one embodiment of this disclosure, the presenting of the hint includes presenting the hint based on an instruction by the user 5 or based on an operation by the instructor.

(Configuration 10)

According to at least one embodiment of this disclosure, the presenting of the hint includes presenting the hint when an answer determined in advance for any one of the one or more words is not obtained within a period of time determined in advance. For example, the hint may be presented in the virtual space 11 when the user 5 cannot provide the correct answer for the meaning of the word presented in the virtual space 11 within a period of time determined in advance.

As described above, in at least one embodiment, each user is able to select a situation and learn a foreign language for each selected situation. For example, each user is able to learn one or more example sentences prepared in advance in accordance with the situations and, if necessary, store the words forming the example sentences in a cloud storage (e.g., server 600). The stored words may be displayed in the virtual space in response to a request by the user 5. In this way, the user 5 is able to learn the example sentences of the foreign language while experiencing the situation in the virtual space. The example sentences are associated with situations, and hence memorization of the example sentences and the words is easier, which increases the learning effect.

In the embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

It is to be understood that the above described embodiments disclosed herein are merely examples in all aspects and in no way intended to limit this disclosure. The scope of this disclosure is defined by the appended claims and not by the above description, and it is intended that this disclosure encompasses all modifications made within the scope and spirit equivalent to those of the appended claims.

The invention claimed is:

1. A method, comprising:
    defining a virtual space, wherein the virtual space comprises a plurality of first objects and a second object;
    defining a plurality of situations to be developed in the virtual space;
    associating each situation of the plurality of situations with a corresponding first object of the plurality of first objects;
    detecting motion by a user associated with a head-mounted display (HMD);
    moving the second object in accordance with the detected motion;

selecting a first object of the plurality of first objects using the second object;

updating the virtual space to a virtual space corresponding to a situation of the plurality of situations corresponding to the selected first object;

displaying in the virtual space a plurality of words associated with the corresponding situation;

selecting at least one word of the plurality of words based on the detected motion; and associating the selected at least one word with the selected situation and registering the associated at least one word in a word list.

2. The method according to claim 1, further comprising displaying in the virtual space a word registered in the word list.

3. The method according to claim 1, further comprising:
identifying, from the plurality of situations, a situation associated with the at least one word registered in the word list;
updating the virtual space to the identified situation; and
presenting in the updated virtual space the word associated with the situation in the word list.

4. The method according to claim 1, further comprising:
associating each word of the plurality of words with a corresponding third object of a plurality of third objects in the virtual space;
selecting a third object of the plurality of third objects using the second object; and
selecting a word of the plurality of words corresponding to the selected third object.

5. The method according to claim 1, further comprising:
selecting a first object of the plurality of first objects based on a detected line of sight of the user; and
identifying a word of the plurality of words corresponding to the selected first object.

6. The method according to claim 1, further comprising:
receiving a command by a second user, the command comprising information for designating the plurality of words; and
presenting in the updated virtual space, among the plurality of words associated with the situation, the plurality of words designated in accordance with the command.

7. The method according to claim 1, wherein the plurality of words comprise at least one word that satisfies an answer criterion determined in advance and at least one word that fails to satisfy the answer criterion.

8. The method according to claim 1, further comprising:
displaying on the HMD an example sentence associated with the plurality of words;
displaying a first word of the plurality of words that satisfies the answer criterion for the example sentence;
displaying a second word of the plurality of words that fails to satisfy the answer criterion; and
displaying a hint for the example sentence.

9. The method according to claim 8, wherein the displaying of the hint comprises displaying the hint in accordance with an instruction from the user.

10. The method according to claim 8, wherein the displaying of the hint comprises displaying the hint in accordance with an operation by a second user.

11. The method according to claim 8, further comprising presenting the hint on the HMD in response to a failure to select the at least one word satisfying the answer criterion within a period of time selected in advance.

12. A system, comprising:
a head-mounted display (HMD);
a processor; and
a non-transitory computer readable medium connected to the processor, wherein the non-transitory computer readable medium is configured to store a program, and the processor is configured to execute the program for:
defining a virtual space, wherein the virtual space comprises a plurality of first objects and a second object;
receiving a plurality of situations to be developed in the virtual space;
associating each situation of the plurality of situations with a corresponding first object of the plurality of first objects;
detecting motion by a user associated with the HMD;
moving the second object in accordance with the detected motion;
selecting a first object of the plurality of first objects using the second object;
updating the virtual space to a virtual space corresponding to a situation of the plurality of situations corresponding to the selected first object;
instructing the HMD to display, in the virtual space, a plurality of words associated with the corresponding situation;
selecting at least one word of the plurality of words based on the detected motion; and
associating the selected at least one word with the selected situation and registering the associated at least one word in a word list.

13. The system according to claim 12, wherein the processor is further configured to instruct the HMD to display, in the virtual space, a word registered in the word list.

14. The system according to claim 12, wherein the processor is further configured to execute the program for:
identifying, from the plurality of situations, a situation associated with the at least one word registered in the word list;
updating the virtual space to the identified situation; and
instructing the HMD to display, in the updated virtual space, the word associated with the situation in the word list.

15. The system according to claim 12, wherein the processor is further configured to execute the program for:
associating each word of the plurality of words with a corresponding third object of a plurality of third objects in the virtual space;
selecting a third object of the plurality of third objects using the second object; and
selecting a word of the plurality of words corresponding to the selected third object.

16. The system according to claim 12, wherein the processor is further configured to execute the program for:
selecting a first object of the plurality of first objects based on a detected line of sight of the user; and
identifying a word of the plurality of words corresponding to the selected first object.

17. The system according to claim 12, wherein the processor is further configured to execute the program for:
receiving a command from a second user, the command comprising information for designating the plurality of words; and
instructing the HMD to display, in the updated virtual space, among the plurality of words associated with the situation, the plurality of words designated in accordance with the command.

18. The system according to claim 12, wherein the plurality of words comprise at least one word that satisfies an answer criterion determined in advance and at least one word that fails to satisfy the answer criterion.

19. The method according to claim 12, wherein the processor is further configured to execute the program for:
   instructing the HMD to display an example sentence associated with the plurality of words;
   instructing the HMD to display a first word of the plurality of words that satisfies the answer criterion for the example sentence;
   instructing the HMD to display a second word of the plurality of words that fails to satisfy the answer criterion; and
   instructing the HMD to display a hint for the example sentence.

20. The system according to claim 19, wherein the processor is further configured to execute the program for instructing the HMD to display the hint in response to a failure to select the at least one word satisfying the answer criterion within a period of time selected in advance.

* * * * *